US008682535B2

(12) United States Patent
Uematsu et al.

(10) Patent No.: US 8,682,535 B2
(45) Date of Patent: *Mar. 25, 2014

(54) VEHICLE SPEED ESTIMATOR AND TRACTION CONTROL DEVICE

(71) Applicants: Koji Uematsu, Oyama (JP); Kazuhiro Hatake, Kanagawa (JP); Azumi Nomura, Hiratsuka (JP)

(72) Inventors: Koji Uematsu, Oyama (JP); Kazuhiro Hatake, Kanagawa (JP); Azumi Nomura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/740,961

(22) Filed: Jan. 14, 2013

(65) Prior Publication Data

US 2013/0131935 A1 May 23, 2013

Related U.S. Application Data

(63) Continuation of application No. 13/142,053, filed as application No. PCT/JP2009/071585 on Dec. 25, 2009.

(30) Foreign Application Priority Data

Jan. 8, 2009 (JP) ................................. 2009-002777

(51) Int. Cl.
*B60R 22/00* (2006.01)

(52) U.S. Cl.
USPC ........ 701/48; 701/1; 701/70; 701/74; 701/82; 701/93; 477/3; 477/75; 477/77

(58) Field of Classification Search
USPC ......... 701/1, 48, 70, 82, 93, 74; 477/3, 75, 77
See application file for complete search history.

(56) References Cited

U.S. PATENT DOCUMENTS

| 4,720,794 A | 1/1988 | Skarvada |
| 4,912,744 A | 3/1990 | Hurst |
| 5,073,865 A | 12/1991 | Togai et al. |
| 5,241,479 A | 8/1993 | Matsuda et al. |
| 5,353,225 A | 10/1994 | Tsuyama et al. |

(Continued)

FOREIGN PATENT DOCUMENTS

| CN | 1853107 A | 10/2006 |
| EP | 0342789 A2 | 11/1989 |

(Continued)

OTHER PUBLICATIONS

International Search Report from International Application No. PCT/JP2009/071581, dated Feb. 23, 2010, 2 pages.

(Continued)

*Primary Examiner* — John R Olszewski
*Assistant Examiner* — Truc M Do
(74) *Attorney, Agent, or Firm* — Fish & Richardson P.C.

(57) ABSTRACT

A vehicle speed estimator includes a unit that selects a minimum rotation speed among rotation speeds of wheels detected by a rotation speed detector and calculates a reference wheel speed of a construction vehicle at every predetermined time. The unit includes: a variable filter processor that performs a low-pass filter processing to the minimum rotation speed, the variable filter processor having a variable time constant; and a time constant changer that changes the time constant of the variable filter processor in accordance with travel conditions of the construction vehicle.

6 Claims, 13 Drawing Sheets

(56) References Cited

U.S. PATENT DOCUMENTS

| | | | |
|---|---|---|---|
| 5,428,539 A | 6/1995 | Kawamura et al. | |
| 5,456,641 A | 10/1995 | Sawase | |
| 5,535,124 A | 7/1996 | Hosseini et al. | |
| 5,588,937 A | 12/1996 | Kono et al. | |
| 5,669,849 A | 9/1997 | Tabata et al. | |
| 5,865,709 A | 2/1999 | Tamura et al. | |
| 5,913,377 A | 6/1999 | Ota et al. | |
| 5,944,392 A | 8/1999 | Tachihata et al. | |
| 5,957,550 A | 9/1999 | Watanabe | |
| 6,185,920 B1 | 2/2001 | Oxley | |
| 6,208,929 B1 | 3/2001 | Matsuno et al. | |
| 6,269,297 B1 | 7/2001 | Hosomi et al. | |
| 6,345,223 B1 | 2/2002 | Takizawa et al. | |
| 6,390,949 B1 | 5/2002 | Kondo et al. | |
| 6,568,763 B2 | 5/2003 | Uematsu et al. | |
| 6,575,023 B2 | 6/2003 | Ohashi et al. | |
| 6,631,320 B1 | 10/2003 | Holt et al. | |
| 6,650,989 B2* | 11/2003 | Gronau et al. | 701/81 |
| 6,671,598 B2 | 12/2003 | Laurent | |
| 6,719,082 B2 | 4/2004 | Uematsu et al. | |
| 6,754,579 B2 | 6/2004 | Kamiya | |
| 6,932,180 B2 | 8/2005 | Matsuno et al. | |
| 6,959,241 B2 | 10/2005 | Itow et al. | |
| 7,016,776 B2 | 3/2006 | Elie et al. | |
| 7,027,904 B2* | 4/2006 | Ishizu et al. | 701/93 |
| 7,152,935 B2 | 12/2006 | Kinder et al. | |
| 7,158,866 B2* | 1/2007 | Gustafsson et al. | 701/1 |
| 7,276,014 B2 | 10/2007 | Goto et al. | |
| 7,444,222 B2 | 10/2008 | Villella et al. | |
| 7,445,142 B2 | 11/2008 | Salani et al. | |
| 7,562,947 B2 | 7/2009 | Katada et al. | |
| 7,599,779 B2 | 10/2009 | Watanabe et al. | |
| 7,770,681 B2 | 8/2010 | Marathe et al. | |
| 8,140,238 B2* | 3/2012 | Luehrsen et al. | 701/82 |
| 2001/0013439 A1 | 8/2001 | Irie | |
| 2001/0027144 A1 | 10/2001 | Murakami et al. | |
| 2002/0007243 A1 | 1/2002 | Yamaguchi | |
| 2002/0033292 A1 | 3/2002 | Uematsu et al. | |
| 2002/0047300 A1 | 4/2002 | Uematsu et al. | |
| 2003/0018425 A1* | 1/2003 | Gronau et al. | 701/71 |
| 2003/0060961 A1* | 3/2003 | Ishizu et al. | 701/93 |
| 2003/0074124 A1* | 4/2003 | Ono et al. | 701/70 |
| 2003/0089547 A1 | 5/2003 | Schenkel et al. | |
| 2003/0141128 A1* | 7/2003 | Hessmert et al. | 180/233 |
| 2003/0150660 A1 | 8/2003 | Ohtsu | |
| 2004/0088103 A1 | 5/2004 | Itow et al. | |
| 2007/0155404 A1 | 7/2007 | Yamane et al. | |
| 2007/0213899 A1 | 9/2007 | Watanabe et al. | |
| 2008/0177495 A1 | 7/2008 | Gold | |
| 2010/0211256 A1* | 8/2010 | Takenaka et al. | 701/29 |
| 2011/0035130 A1 | 2/2011 | Noguchi et al. | |
| 2011/0246031 A1 | 10/2011 | Uematsu et al. | |
| 2011/0251762 A1 | 10/2011 | Uematsu et al. | |
| 2011/0257847 A1 | 10/2011 | Uematsu et al. | |
| 2011/0257851 A1 | 10/2011 | Uematsu et al. | |
| 2011/0257861 A1 | 10/2011 | Uematsu et al. | |
| 2011/0270497 A1 | 11/2011 | Uematsu et al. | |
| 2012/0041651 A1 | 2/2012 | Uematsu et al. | |

FOREIGN PATENT DOCUMENTS

| | | |
|---|---|---|
| EP | 0992411 A2 | 4/2000 |
| JP | S59-093560 A | 5/1984 |
| JP | S62-196442 A | 8/1987 |
| JP | S64-030866 A | 2/1989 |
| JP | H01-145242 A | 6/1989 |
| JP | H02-038172 A | 2/1990 |
| JP | H02-095927 A | 4/1990 |
| JP | H02-114052 A | 4/1990 |
| JP | H03-132461 A | 6/1991 |
| JP | H04-55158 A | 2/1992 |
| JP | H05-016686 A | 1/1993 |
| JP | H05-187284 A | 7/1993 |
| JP | H08-014075 A | 1/1996 |
| JP | H08-258588 A | 10/1996 |
| JP | H09-086367 A | 3/1997 |
| JP | H09-290729 A | 11/1997 |
| JP | H10-029524 A | 2/1998 |
| JP | H10-230837 A | 9/1998 |
| JP | H11-115719 A | 4/1999 |
| JP | 2000-344082 A | 12/2000 |
| JP | 2000-344084 A | 12/2000 |
| JP | 2001-082199 A | 3/2001 |
| JP | 2001-122099 A | 5/2001 |
| JP | 2001-219838 A | 8/2001 |
| JP | 2001-277896 A | 10/2001 |
| JP | 2002-029401 A | 1/2002 |
| JP | 2002-029402 A | 1/2002 |
| JP | 2002-087095 A | 3/2002 |
| JP | 2003-104186 A | 4/2003 |
| JP | 2003-237398 A | 8/2003 |
| JP | 2004-175347 A | 6/2004 |
| JP | 2004-517314 A | 6/2004 |
| WO | 2005/015060 A1 | 2/2005 |
| WO | 2005/015244 A1 | 2/2005 |
| WO | 2010/074225 A1 | 7/2010 |
| WO | 2010/074226 A1 | 7/2010 |
| WO | 2010/074227 A1 | 7/2010 |
| WO | 2010/079704 A1 | 7/2010 |
| WO | 2010/079705 A1 | 7/2010 |

OTHER PUBLICATIONS

International Search Report from International Application No. PCT/JP2009/071582, dated Feb. 9, 2010, 1 page.
International Search Report from International Application No. PCT/JP2009/071583, dated Feb. 9, 2010, 1 page.
International Search Report from International Application No. PCT/JP2009/071584, dated Feb. 9, 2010, 2 pages.
International Search Report from International Application No. PCT/JP2009/071585, dated Apr. 13, 2010, 2 pages.
Non-final Office Action dated Feb. 16, 2012 in U.S. Appl. No. 13/175,107, 16 pages.
Notice of Allowance dated Oct. 9, 2012 in U.S. Appl. No. 13/175,107, 15 pages.
Notice of Reason(s) for Rejection issued Mar. 13, 2012 in Japanese Patent Application No. JP 2010-545726, including English Translation, 5 pages.
European Search Report dated Nov. 7, 2012 from European Application No. 09837590.0, 6 pages.
Non-final Office Action dated Feb. 14, 2013 in U.S. Appl. No. 13/142,053, 30 pages.
Non-final Office Action dated May 1, 2013 in U.S. Appl. No. 13/740,954, 36 pages.
Office Action issued Mar. 28, 2013 in corresponding Chinese Patent Application No. 200980138356.9, including English translation, 8 pages.

* cited by examiner

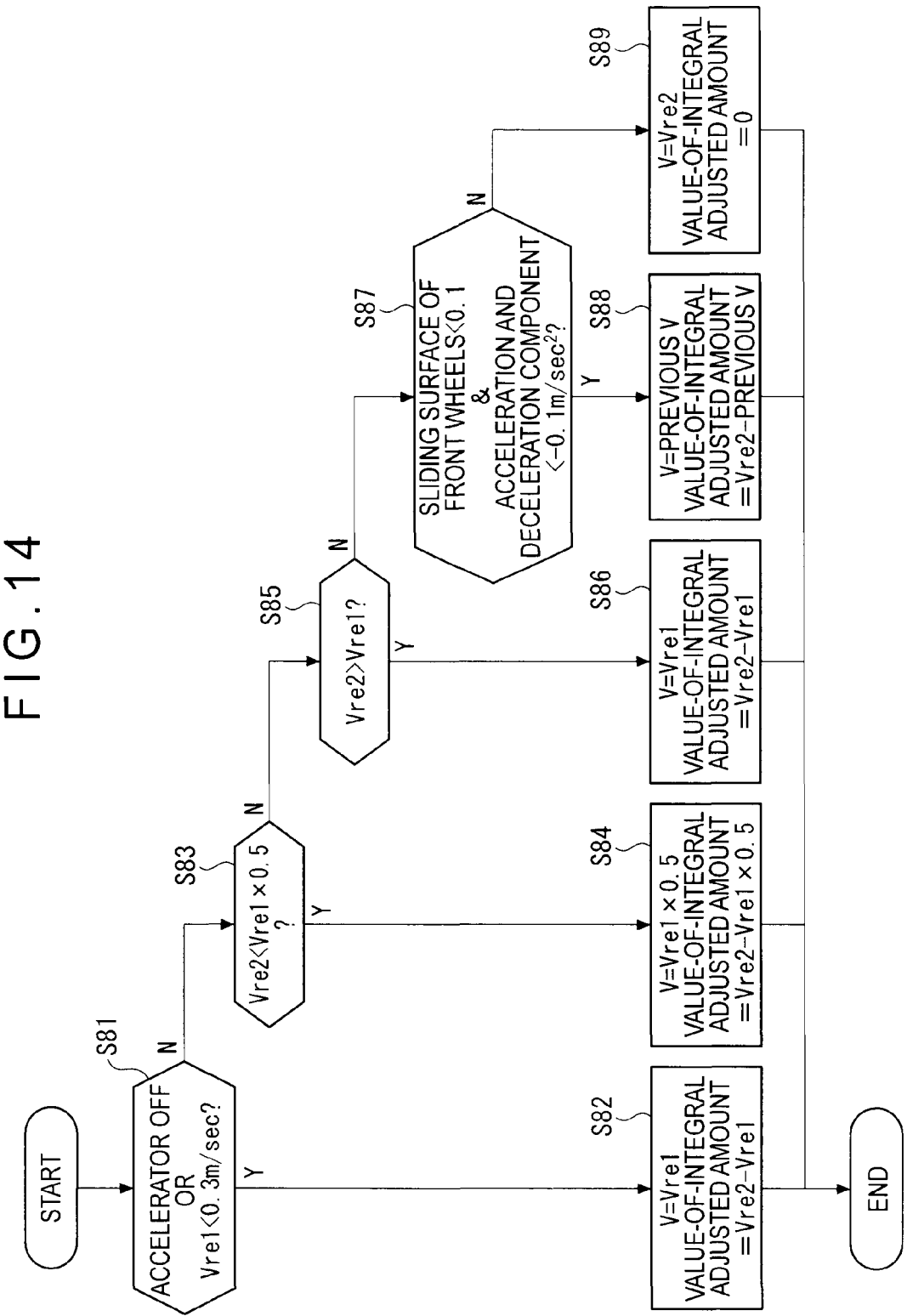

VEHICLE SPEED ESTIMATOR AND TRACTION CONTROL DEVICE

CROSS REFERENCE TO RELATED APPLICATIONS

This application is a continuation of U.S. application Ser. No. 13/142,053, filed Jun. 24, 2011, which application claims priority to Application No. PCT/JP2009/071585 filed on Dec. 25, 2009, which application claims priority to Japanese Application No. 2009-002777, filed on Jan. 8, 2009. The entire contents of the above applications are incorporated herein by reference in their entireties.

TECHNICAL FIELD

The present invention relates to a vehicle speed estimator and a traction control apparatus.

BACKGROUND ART

Typically, vehicles such as automobiles are occasionally installed with a traction control apparatus and the like to prevent drive slip. There has been known that, when an accelerator operation, a low-n-road driving or the like causes drive slip, such a traction control apparatus performs a braking control of a brake and driving control of an engine to generate appropriate traction on wheels, thereby preventing wheel slip.

When the traction control apparatus is installed in a two-wheel-drive car, a vehicle speed can easily be estimated by detecting rotation speeds of driven wheels (not driving wheels) by a sensor and the like.

However, since all wheels of all-wheel-drive vehicles such as a four-wheel-car are driving wheels, all the wheels may generate drive slip. Accordingly, it is difficult to accurately estimate a vehicle speed only by detecting rotation speeds of all the wheels.

Accordingly, an all-wheel-drive vehicle is installed with a rotation speed sensor for wheels and an acceleration sensor. A select wheel to be referred to is selected based on a rotation speed of each of the wheels by the rotation speed sensor. A vehicle speed is estimated based on the rotation speed of the select wheel and an output from the acceleration sensor (see, for instance, Patent Literature 1).

CITATION LIST

Patent Literature

Patent Literature 1: JP-A-2001-82199

SUMMARY OF THE INVENTION

Problems to be Solved by the Invention

The technique disclosed in the Patent Literature 1 presupposes a convergence of slip that is determined under the condition that the rotation speed of each of the wheels is within a predetermined deviation from a target rotation speed.

However, a construction vehicle such as a dump truck is assumed to drive on an irregular ground. Since road surface conditions constantly change and conditions of the wheels (e.g., currently slipping or slippery) also constantly change, a vehicle speed cannot be estimated with high accuracy due to such a large disturbance.

Accordingly, the convergence of slip is not maintained so long. Even though slip is convergent under the conditions, when the select wheel is exchanged among the wheels (i.e., between front and rear ones or between right and left ones) within a predetermined deviation, the rotation speed of the select wheel is largely changed, thereby hampering estimation of the vehicle speed.

An object of the invention is to provide a vehicle speed estimator and a traction control apparatus capable of estimating a vehicle speed with high accuracy even under dynamically changing conditions of a road surface on which an all-wheel-drive construction vehicle travels.

Means for Solving the Problems

A vehicle speed estimator according to an aspect of the invention that estimates a vehicle speed of an all-wheel-drive construction vehicle includes: a rotation speed detector that detects a rotation speed of each of wheels at every predetermined time; and a reference wheel-speed calculator that selects a minimum rotation speed among the rotation speeds of the wheels detected by the rotation speed detector, calculates a reference wheel speed of the construction machine at every predetermined time, and output the reference wheel speed, in which the reference wheel-speed calculator includes: a minimum wheel-speed calculator that calculates a minimum wheel speed at every predetermined time based on the rotation speeds detected by the rotation speed detector; a variable filter processor that performs a low-pass filter processing to the minimum wheel speed calculated by the minimum wheel-speed calculator, the variable filter processor having a variable time constant; and a time constant changer that changes the time constant of the variable filter processor in accordance with a travel condition of the construction vehicle, and the time constant changer comprises an acceleration and deceleration time constant changer that sets the time constant of the variable filter processor for the low-pass filter processing to be smaller than a predetermined value when the minimum wheel speed calculated from the rotation speed of the one of the wheels having the minimum rotation speed detected by the rotation speed detector is decelerating, and that sets the time constant of the variable filter processor for the low-pass filter processing to be larger than the predetermined value when the minimum wheel speed is accelerating.

The vehicle speed estimator according to the above aspect of the invention preferably includes a vehicle speed estimation unit that estimates the vehicle speed of the construction machine based on the reference wheel speed calculated by the reference wheel-speed calculator and outputs the estimated vehicle speed.

According to the above aspect of the invention, since the time constant changer is provided, the time constant of the variable filter processor can be changed in accordance with the travel conditions of the construction vehicle. Accordingly, an output timing of the minimum wheel speed calculated at every predetermined time by the minimum wheel-speed calculator can be changed in accordance with the travel conditions of the construction vehicle, thereby estimating the vehicle speed with high accuracy.

With this arrangement, since the acceleration and deceleration time constant changer is provided, when the minimum wheel speed is decreasing, it is predicted that the minimum wheel speed is likely to approach the actual speed of the construction vehicle. Accordingly, by setting the time constant of the low-pass filer processing by the variable filter processor to be smaller than the predetermined value when deceleration is detected, responsiveness is increased and the reference wheel speed is easily conformed to a minimum wheel speed, so that the vehicle speed of the construction vehicle can be estimated with high accuracy.

On the other hand, when the minimum wheel speed is increasing, it is predicted that the minimum wheel speed is likely to deviate from the actual speed of the construction vehicle. Accordingly, by setting the time constant of the low-pass filer processing to be larger than the predetermined value when acceleration is detected, a large change of the reference wheel speed can be avoided to reduce errors in the vehicle speed estimated by the vehicle speed estimator.

The idea to set the time constant of the low-pass filter processing to be larger includes a case where the reference wheel speed obtained by the filter processing is not changed.

In the vehicle speed estimator according to the above aspect of the invention, the vehicle speed estimator further includes a wheel-speed distribution calculator that acquires a maximum wheel speed and the minimum wheel speed from the rotation speeds of the wheels detected by the rotation speed detector and calculates a distribution of wheel speeds of the wheels at every predetermined time based on a difference between the maximum wheel speed and the minimum wheel speed, in which the time constant changer preferably includes a wheel-speed distribution time constant changer that changes the time constant of the variable filter processor when determining that the distribution of the wheel speeds calculated by the wheel-speed distribution calculator is a predetermined threshold or more.

With this arrangement, since the wheel-speed distribution time constant changer is provided, when a distribution (variation) of the rotation speeds of the wheels is large, it is predicted that the vehicle is traveling on an uneven road surface or uneven loads act on the respective wheels to cause one of the wheels having the maximum wheel speed to slip and another of the wheels having the minimum wheel speed to be close to the actual vehicle speed of the construction vehicle. Accordingly, by changing the time constant of the low-pass filter processing to immediately conform the reference wheel speed to the minimum wheel speed, the vehicle speed of the construction vehicle can be estimated with high accuracy.

In the vehicle speed estimator according to the above aspect of the invention, the vehicle speed estimator further includes a gear-shift state determiner that determines a state of the transmission of the construction vehicle, in which the time constant changer includes a gear-shift state time constant changer that increases the time constant of the variable filter processor when the gear-shift state determiner determines that the transmission is getting shifted.

With this arrangement, the gear-shift state determiner and the gear-shift state time constant changer are provided. Accordingly, when a gear of the transmission of the construction vehicle is shifted, a gear ratio of the transmission is changed. Consequently, it is predicted that an output torque of the transmission is changed after the gear is shifted. The following goes on.

Specifically, after the gear is shifted, drive torque from the engine is lost to drastically decrease the minimum wheel speed. Subsequently, when the shifted gear is engaged with the output shaft of the engine, drive torque is generated to re-increase the minimum wheel speed. When the minimum wheel speed is decreased, it is predicted that the minimum wheel speed approaches the actual vehicle speed of the construction vehicle. In such a situation, it is natural to decrease the time constant and perform a control to conform the reference wheel speed to the minimum wheel speed. However, in a traction control apparatus provided with the vehicle speed estimator according to the aspect of the invention, an excessive control to conform the reference wheel speed to the minimum wheel speed causes excessive application of the brakes when the minimum wheel speed is increased by generation of drive torque.

Accordingly, with this arrangement, by increasing the time constant and not excessively conforming the reference wheel speed to the minimum wheel speed, an excessive application of the brakes in the traction control apparatus can be prevented.

In the vehicle speed estimator according to the above aspect of the invention, the vehicle speed estimator further includes a gear-shift state determiner that determines a state of the transmission of the construction vehicle, in which the time constant changer preferably includes a lockup switch time constant changer that changes the time constant of the variable filter processor when the gear-shift state determiner determines that a predetermined time does not pass after a lockup-release command has been output in the transmission.

With this arrangement, the gear-shift state determiner and the lockup switch time constant changer are provided. The following goes on in the same manner as the above.

Specifically, when the transmission is just switched from a lockup state to a torque converter, drive torque from the engine is declined to drastically decrease the minimum wheel speed. Subsequently, drive torque is generated to re-increase the minimum wheel speed. When the minimum wheel speed is decreased, it is predicted that the minimum wheel speed approaches the actual vehicle speed of the construction vehicle. In such a situation, it is natural to decrease the time constant and perform a control to conform the reference wheel speed to the minimum wheel speed. However, in a traction control apparatus provided with the vehicle speed estimator according to the aspect of the invention, when the reference wheel speed is excessively conformed to the minimum wheel speed, the brakes may be excessively applied as a result of an increase in the minimum wheel speed due to generation of drive torque.

Accordingly, with this arrangement, by increasing the time constant and not excessively conforming the reference wheel speed to the minimum wheel speed, an excessive application of the brakes in the traction control apparatus can be prevented.

A traction control apparatus according to another aspect of the invention controls a braking mechanism and a differential adjusting mechanism in an all-wheel-drive construction vehicle, the braking mechanism provided to each of wheels, the differential adjusting mechanism adjusting a differential between front ones of the wheels and rear ones of the wheels.

The traction control apparatus includes: any one of the vehicle speed estimators described above, a braking mechanism controller that controls the braking mechanism based on an estimated vehicle speed of the construction machine which is estimated by the vehicle speed estimator; and a differential adjusting mechanism controller that controls the differential adjusting mechanism based on the vehicle speed of the construction machine which is estimated by the vehicle speed estimator.

According to the above aspect of the invention, since the traction control apparatus is provided with the above-described vehicle speed estimator, the vehicle speed of the construction vehicle can be estimated with high accuracy, thereby allowing a suitable traction control.

BRIEF DESCRIPTION OF DRAWINGS

FIG. 14 is a flowchart for illustrating a vehicle speed estimation processing by a vehicle speed estimation unit in the exemplary embodiment.

DESCRIPTION OF THE EXEMPLARY EMBODIMENT(S)

Exemplary embodiment(s) of the invention will be described below with reference to the attached drawings.

1. Structure of Dump Truck 1

Figure 1:
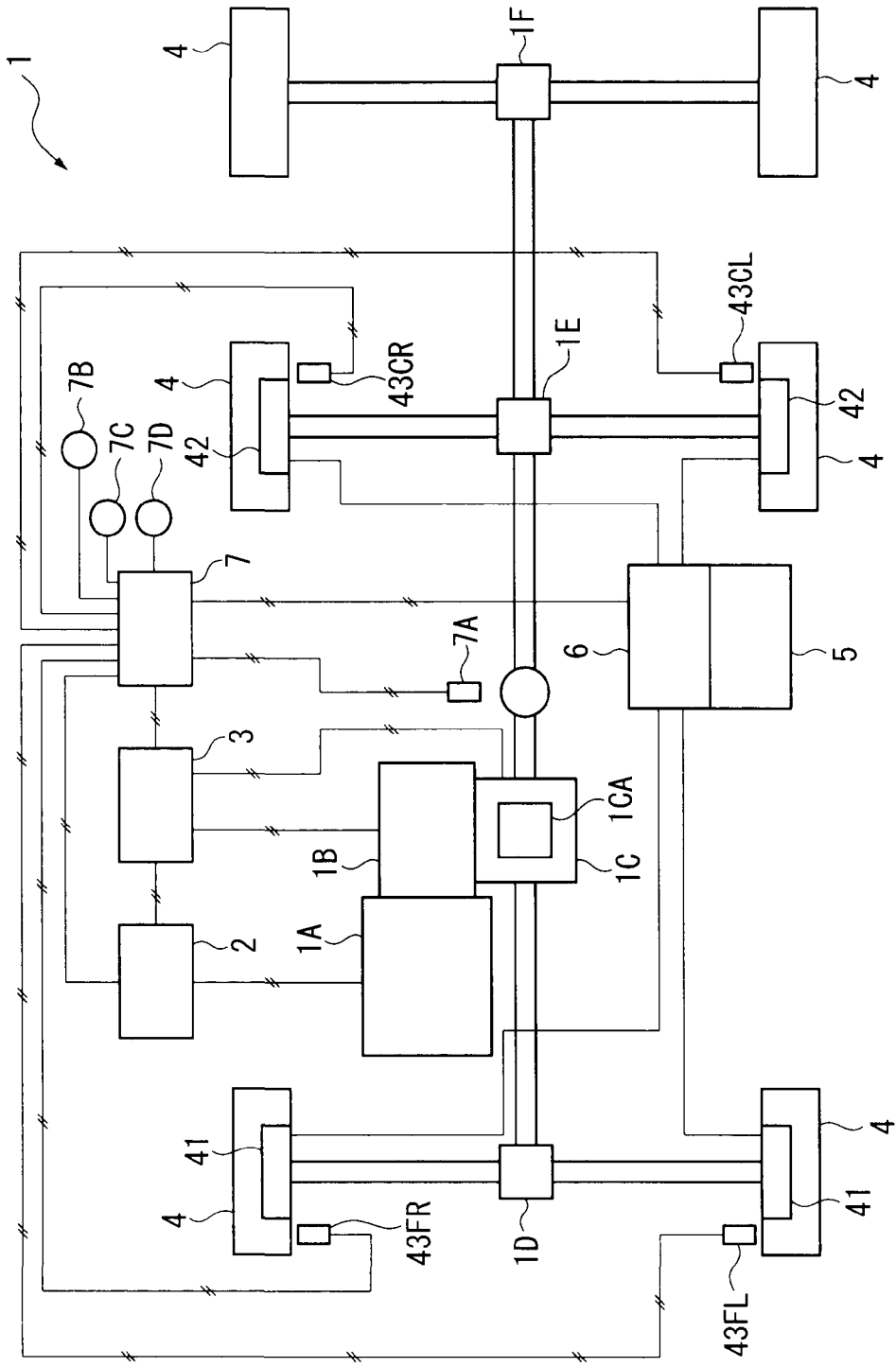
FIG. 1 is a schematic view showing a structure of a construction vehicle according to an exemplary embodiment of the invention.

FIG. 1 shows a dump truck 1 according to an exemplary embodiment of the invention. The dump truck 1 is an articulated truck that includes separate front and rear vehicle body frames. A vehicle body of the dump truck 1 includes an engine 1A, a transmission 1B, differential mechanisms 1C to 1F and a differential adjusting mechanism 1CA. The output of the engine 1A is controlled by an engine controller 2, and is transmitted to the transmission 1B. The transmission 1B includes a torque converter (not shown). A transmission controller 3 performs gear-shift control on the transmission 1B.

A rotary driving force transmitted from the engine 1A to the transmission 1B rotates all wheels 4 via the differential mechanisms 1C to 1F and is transmitted to a road surface.

In this exemplary embodiment, the differential mechanism 1C is provided with the differential adjusting mechanism 1CA, so that a differential of the differential mechanism 1C can be restrained by the differential adjusting mechanism 1CA. Thus, the differential mechanisms 1D and 1E are in a so-called direct connection in which only the differentials of the right and left wheels are acceptable but not the differentials of the front and rear wheels.

The wheels 4 in the vehicle body are provided with front brakes 41 and center brakes 42. The front brakes 41 and the center brakes 42 are hydraulically connected to a brake hydraulic circuit 5 and a TCS control hydraulic circuit 6 (see FIG. 2).

Figure 2:
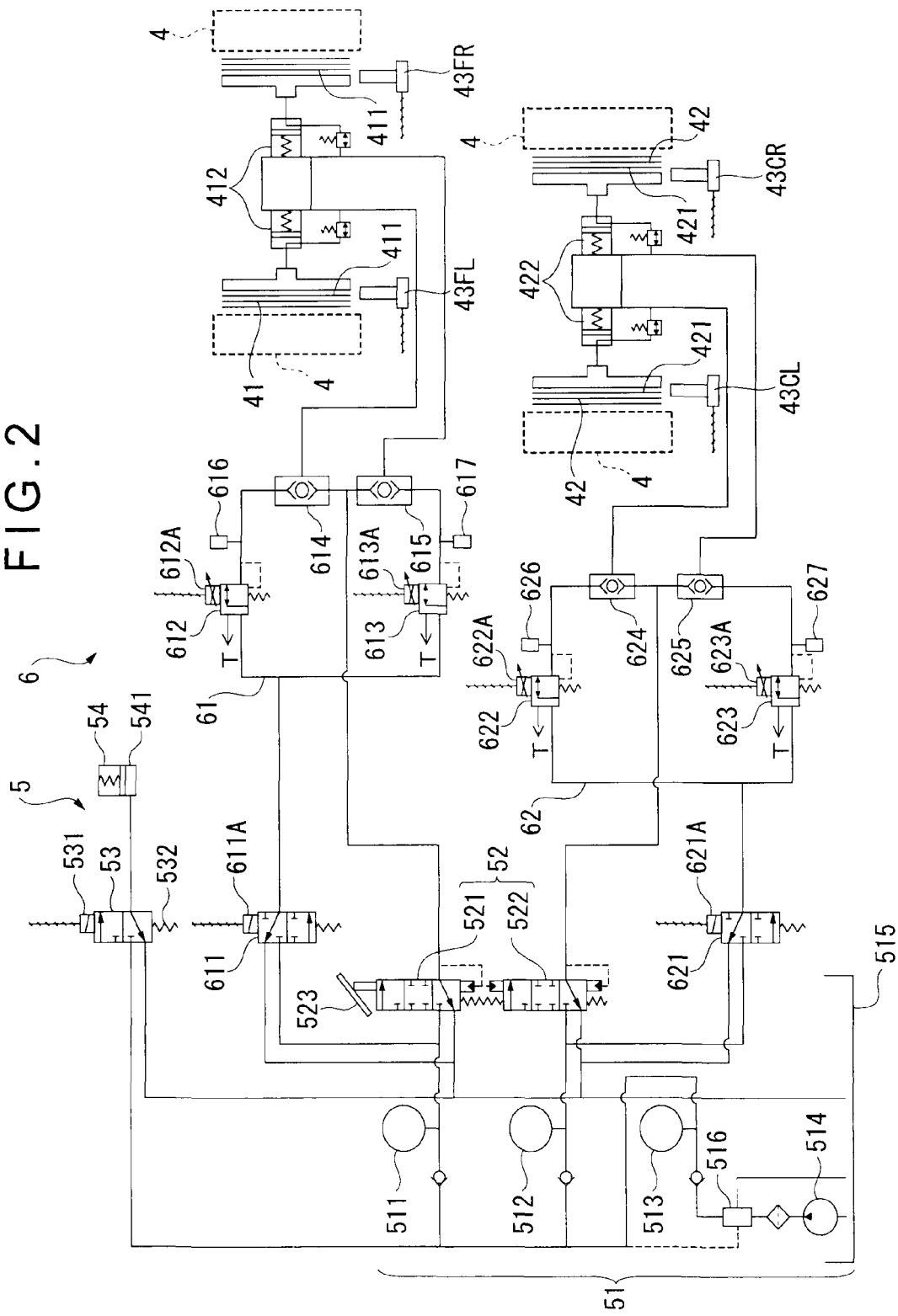
FIG. 2 is a hydraulic circuit diagram of the construction vehicle according to the exemplary embodiment.

A braking mechanism includes the front brakes 41, the center brakes 42, the brake hydraulic circuit 5 and the TCS control hydraulic circuit 6 (see FIG. 2).

The wheels 4 are respectively provided with rotation speed sensors (i.e., rotation speed detectors) 43FL, 43FR, 43CL and 43CR (which are described later in detail) for detecting the rotation speeds of the wheels 4. A rotation speed signal detected by each of the rotation speed sensors 43FL, 43FR, 43CL and 43CR is output to a TCS controller 7 as an electrical signal.

The TCS controller 7 includes: an articulate angle sensor 7A for detecting an articulate angle (bending angle) of the dump truck 1; and an acceleration sensor (acceleration detector) 7D for detecting acceleration operating in a front and rear direction. The articulate angle detected by the articulate angle sensor 7A and the acceleration detected by the acceleration sensor 7D are output to the TCS controller 7 as electrical signals.

A TCS system switch 7B for cancelling TCS control is electrically connected to the TCS controller 7.

The TCS controller 7 controls the brake torques of the front brakes 41 and the center brakes 42 via the hydraulic circuits 5 and 6 and performs an inter-axle differential control for adjusting the differential restraining force of the differential adjusting mechanism 1CA. The TCS controller 7 also functions as a controller for retarder control. The TCS controller 7 performs the retarder control in accordance with an operation signal from a retarder control lever 7C used for setting a retarder speed.

2. Structure of Brake Hydraulic Circuit 5

FIG. 2 shows the brake hydraulic circuit 5 of the dump truck 1. In this exemplary embodiment, the front brakes 41 and the center brakes 42 include multi-disc brakes 411 and 421 and slack adjusters 412 and 422, respectively. The slack adjusters 412 and 422 are hydraulically connected to the brake hydraulic circuit 5 and the TCS control hydraulic circuit 6.

All the front brakes 41 and the center brakes 42 are hydraulically controlled, so that when pressure oil is discharged from the brake hydraulic circuit 5, the discharged pressure oil is supplied to related portions of the front brakes 41 and the center brakes 42 via the TCS control hydraulic circuit 6, thereby hydraulically driving the related portions.

The slack adjusters 412 and 422 are devices capable of automatically adjusting gaps resulting from abrasion of the front brakes 41 and the center brakes 42.

The brake hydraulic circuit 5 includes a hydraulic supply system 51, a foot brake valve 52 and a parking brake valve 53.

The hydraulic supply system 51 includes a plurality of hydraulic accumulators 511, 512 and 513 as hydraulic sources, a hydraulic pump 514 and a reservoir 515. Pressure oil is supplied from the hydraulic accumulators 511, 512 and 513 to the front brakes 41 and the center brakes 42 via the TCS control hydraulic circuit 6, thereby braking the wheels 4.

Each of the hydraulic accumulators 511, 512 and 513 receives the pressure oil in the reservoir 515, the pressure of which is boosted with the assistance of the hydraulic pump 514 driven by the engine 1A (driving source), to accumulate a predetermined pressure. When the predetermined pressure is obtained, an unload device 516 disposed between the hydraulic pump 514 and the hydraulic accumulator 513 unloads the pressure oil from the hydraulic pump 514.

The foot brake valve 52 includes a front brake valve 521 and a center brake valve 522. When a brake pedal 523 is operated, the front brake valve 521 and the center brake valve 522 respectively supply the pressure oil of the hydraulic accumulators 511 and 512 to the front brakes 41 and the center brakes 42 for braking.

Specifically, when the brake pedal 523 is operated, the position of the spool of the front brake valve 521 is shifted and the pressure oil of the hydraulic accumulator 511 is discharged from the front brake valve 521. The pressure oil is supplied to the front brakes 41 via a front hydraulic circuit 61 in the TCS control hydraulic circuit 6 to effect the braking of the front brakes 41.

More specifically, the pressure oil discharged from the front brake valve 521 acts on the right and left front brakes 41 with a substantially equal pressure via shuttle valves 614 and 615, thereby equally performing the braking on the right and left sides.

The pressure oil discharged from the center brake valve 522 acts on the right and left center brakes 42 with a substantially equal pressure via shuttle valves 624 and 625, thereby equally performing the braking on the right and left sides.

Simultaneously, the position of the spool of the center brake valve 522 is shifted, so that the pressure oil of the hydraulic accumulator 512 is discharged from the center brake valve 522. The pressure oil is supplied to the center brake 42 via a center hydraulic circuit 62 to effect the braking of the center brakes 42.

The parking brake valve 53 is a valve for controlling a parking brake 54. The parking brake valve 53 includes a solenoid 531 and a spring 532. When a parking switch disposed in an operation room (not shown) is switched to a parking position, and thus, the position of the parking brake valve 53 is shifted with the assistance of the solenoid 531, the parking brake valve 53 supplies pressure oil in the hydraulic accumulator 513 to a cylinder chamber 541 of the parking brake 54, thereby increasing a parking brake pressure. As a result, when the vehicle is parked, the braking condition is maintained.

Although shown in the upper left in FIG. 2, practically, the parking brake 54 is provided in parallel with the front brakes 41 or the center brakes 42, or is provided to a brake attached to a drive shaft that transmits a driving force.

When the vehicle travels, a parking switch (not shown) is switched to a travel position, and thus, the position of the parking brake valve 53 is shifted to a position where the pressure oil from the hydraulic accumulator 513 is blocked, so that the pressure oil in a cylinder chamber 541 of the parking brake 54 is directed back to the reservoir 515 of the hydraulic supply system 51, thereby reducing a parking brake pressure to zero. As a result, when the vehicle travels, the vehicle is movable.

3. Structure of TCS Control Hydraulic Circuit 6

As shown in FIG. 2, the TCS control hydraulic circuit 6 is disposed in the middle of a hydraulic circuit extending from the brake hydraulic circuit 5 to the front brakes 41 and the center brakes 42. The TCS control hydraulic circuit 6 includes a front hydraulic circuit 61 and a center hydraulic circuit 62.

The front hydraulic circuit 61 is a hydraulic circuit configured to perform TCS brake control on the front brakes 41. The front hydraulic circuit 61 includes a front TCS switching valve 611, two solenoid proportional control valves 612 and 613, the two shuttle valves 614 and 615 and pressure sensors 616 and 617.

The front TCS switching valve 611 is capable of switching whether or not to perform the TCS brake control on the front brakes 41 in response to an electric signal output from the TCS controller 7 to a solenoid 611A of the switching valve 611.

The solenoid proportional control valves 612 and 613 are control valves that are respectively disposed on pipe lines branched in the middle of a pipe line having an end connected to the output side of the front TCS switching valve 611. The solenoid proportional control valves 612 and 613 are configured to control the brake pressure of the front brakes 41 during the TCS brake control. The solenoid proportional control valve 612 is a valve configured to control pressure oil supply to the left one of the front brakes 41. The solenoid proportional control valve 613 is a valve configured to control pressure oil supply to the right one of the front brakes 41.

The opening degrees of the solenoid proportional control valves 612 and 613 are respectively adjusted by the solenoids 612A and 613A. After being depressurized and discharged, the hydraulic oil is partly directed back to the reservoir 515 of the above hydraulic supply system 51.

The shuttle valves 614 and 615 are disposed on the output sides of the solenoid proportional control valves 612 and 613, respectively. The shuttle valves 614 and 615 have, on one sides thereof, inputs being connected to outputs from the solenoid proportional control valve 612 and 613, and, on the other sides thereof, inputs being connected to each other via a pipe that communicates the inputs of the shuttle valves 614 and 615 to each other. In the middle of this pipe, an output pipe for the front brake valve 521 is connected.

The pressure sensors 616 and 617 are respectively disposed in the middles of pipes extending between the shuttle valves 614 and 615 and the solenoid proportional control valves 612 and 613. The pressure sensors 616 and 617 are configured to detect the brake pressure of the front brakes 41 and to output the detected signals to the TCS controller 7 as electric signals. The pressure sensors 616 and 617 may be disposed in the middles of pipes extending between the shuttle valves 614, 615, 624 and 625 and the slack adjusters 412 and 422.

The center hydraulic circuit 62 is a hydraulic circuit configured to perform TCS brake control on the center brakes 42. The center hydraulic circuit 62 includes a center TCS switching valve 621, two solenoid proportional control valves 622 and 623, the two shuttle valves 624 and 625, and pressure sensors 626 and 627 in the same manner as the front hydraulic circuit 61.

The solenoid proportional control valves 622 and 623 are respectively provided with solenoids 622A and 623A. The opening degree of each of the solenoid proportional control valves 622 and 623 is adjusted in accordance with an electric signal output from the TCS controller 7.

The center TCS switching valve 621 is provided with a solenoid 621A. The center TCS switching valve 621 likewise switches whether or not to perform TCS on the center brakes 42 in accordance with the electrical signal output from the TCS controller 7.

The TCS control hydraulic circuit 6 enables a TCS function through the shifting of the positions of the valves of the above front hydraulic circuit 61 and center hydraulic circuit 62.

When the spool of the front TCS switching valve 611 is set at an upper position and the spool of the center TCS switching valve 621 is set at an upper position in FIG. 2, the TCS function is disabled.

In contrast, when the spool of the front TCS switching valve 611 is set at a lower position and the spool of the center TCS switching valve 621 is set at a lower position in FIG. 2, the TCS function is enabled.

In this case, in the front hydraulic circuit 61, the pressure oil discharged from the front TCS switching valve 611 is supplied to the solenoid proportional control valves 612 and 613. The opening degrees of the solenoid proportional control valves 612 and 613 are adjusted in accordance with an electric signal from the TCS controller 7. The pressure oil discharged from the solenoid proportional control valves 612 and 613 is supplied to the front brakes 41 via the shuttle valves 614 and 615.

In the center hydraulic circuit 62, the pressure oil discharged from the center TCS switching valve 621 is supplied to the solenoid proportional control valves 622 and 623. The pressure oil discharged from the solenoid proportional control valves 622 and 623 is supplied to the center brakes 42 via the shuttle valves 624 and 625.

At this time, the TCS controller 7 monitors the rotation speeds of the wheels 4 detected by the rotation speed sensors 43FL, 43FR, 43CL and 43CR, and outputs electric signals to the solenoids 612A, 613A, 622A and 623A in accordance with the slip ratios of the wheels 4 (which will be described later in detail). As a result, the opening degrees of the solenoid proportional control valves 612, 613, 622 and 623 are adjusted, thereby adjusting the braking forces of the front brakes 41 and center brakes 42. In this manner, while adjusting the driving force of each of the wheels 4 to an optimum value, the TCS controller 7 performs control for ensuring course-traceability when the vehicle is turned.

When the brake pedal 523 is operated, on the front side, the pressure oil discharged from the front brake valve 521 is supplied to the front brakes 41 via the shuttle valves 614 and 615, so that each of the front brakes 41 functions as a normal brake that increases the braking force thereof in accordance with the pressed amount of the brake pedal 523. On the rear side, the pressure oil discharged from the center brake valve 522 is supplied to the center brakes 42 via the shuttle valves 624 and 625, and each of the center brakes 42 likewise functions as a normal brake.

The solenoid proportional control valves 612, 613, 622 and 623 are also used as control valves for retarder control. The opening degree of each of the solenoid proportional control valves 612, 613, 622 and 623 is adjusted in accordance with a retarder command signal from the TCS controller 7.

4. Structure of TCS Controller 7

Figure 3:
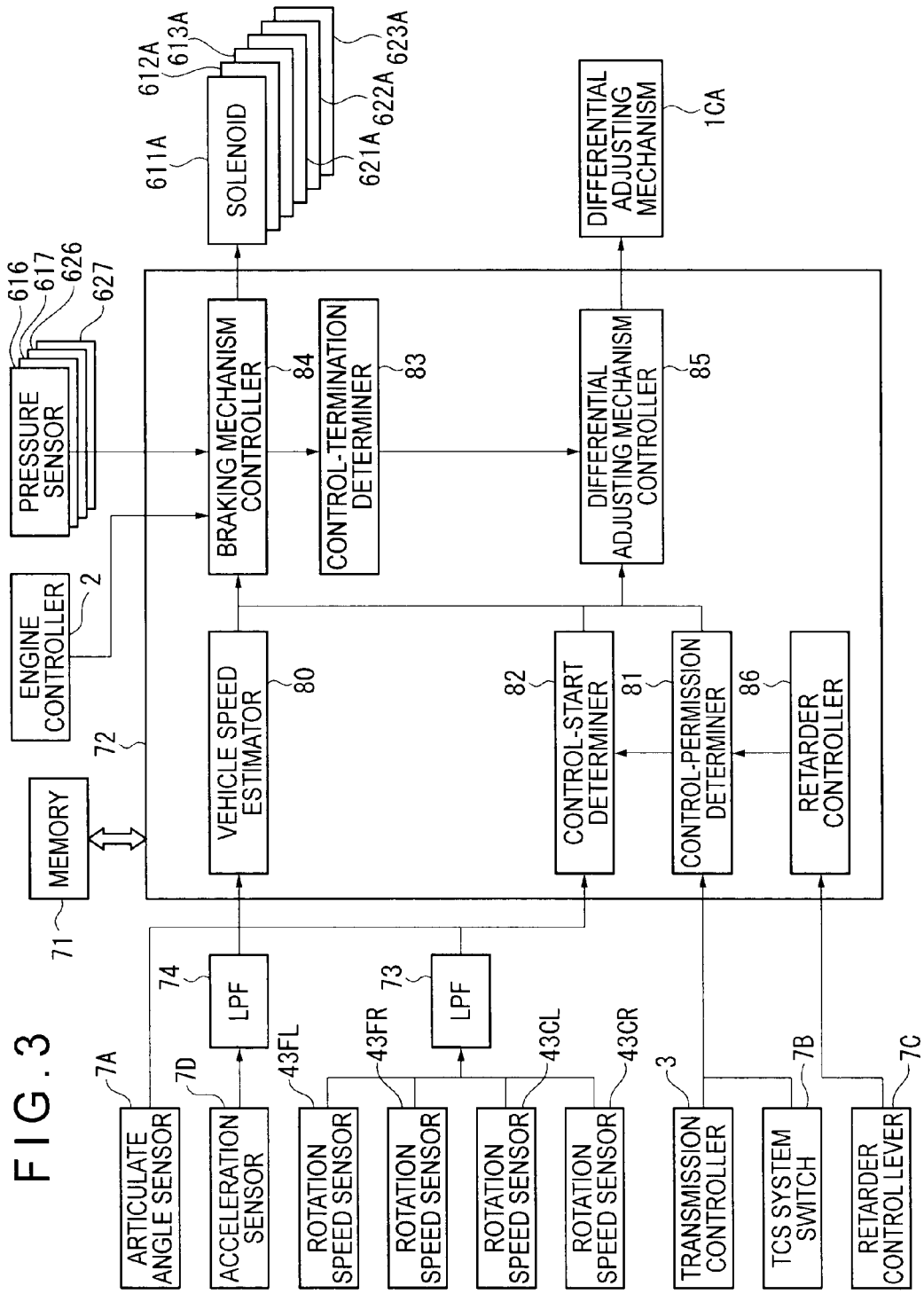
FIG. 3 is a functional block diagram of a TCS controller according to the exemplary embodiment.

FIG. 3 shows the structure of the TCS controller 7 that performs the above TCS control.

The TCS controller 7 includes a memory 71 as a storage and a processor 72.

The memory 71 stores not only a program executable on the processor 72 but also a map for TCS sliding mode control and the like, which are readable upon a request from the processor 72.

The rotation speed sensors 43FL, 43FR, 43CL and 43CR, the articulate angle sensor 7A, the TCS system switch 7B, the retarder control lever 7C and the pressure sensors 616, 617, 626 and 627 are connected to the input side of the processor 72.

The rotation speed sensors 43FL, 43FR, 43CL and 43CR and the acceleration sensor 7D are connected to the processor 72 via LPFs (Low Pass Filter) 73 and 74, so that rotation speed signals output from the rotation speed sensors 43FL, 43FR, 43CL and 43CR, and an acceleration signal output from the acceleration sensor 7D, from which a high-frequency component such as disturbance has been eliminated, are input to the processor 72 as rotation speeds ωfl, ωfr, ωcl and ωcr and as an acceleration acting in a travel direction of the dump truck 1.

In contrast, the solenoids 611A and 621A of the TCS switching valves 611 and 621 and the solenoids 612A, 613A, 622A and 623A of the solenoid proportional control valves 612, 613, 622 and 623 of the TCS control hydraulic circuit 6 are electrically connected to the output side of the processor 72.

The processor 72 is also electrically connected to the engine controller 2 and the transmission controller 3 so that information is exchangeable therebetween. Thus, the processor 72 can acquire various kinds of information required for the TCS control and the inter-axle differential control from the engine controller 2 and the transmission controller 3, such as an output torque value of the engine from the engine controller 2, and speed stage information and lock-up information from the transmission controller 3.

The processor 72 includes a vehicle speed estimator 80, a control-permission determiner 81, a control-start determiner 82, a control-termination determiner 83, a braking mechanism controller 84, a differential adjusting mechanism controller 85 and a retarder controller 86.

The control-permission determiner 81 determines whether or not to permit the TCS control. Specifically, the control-permission determiner 81 determines whether or not to permit the TCS control based on an operation condition of the TCS system switch 7B, an operation condition of the brake pedal 523, the speed stage information of the transmission 1B, a control condition of the retarder control, and an operation condition of an accelerator pedal (not shown).

The control-start determiner 82 is a section for determining whether or not start conditions for the TCS brake control have been fulfilled. The determination is based on the rotation speed signals of the wheels 4 detected by the rotation speed sensors 43FL, 43FR, 43CL and 43CR. Specifically, the control-start determiner 82 determines to start at least one of the TCS control and the inter-axle differential control when a rotation speed difference of the right and left wheels and a rotation speed difference of the front and rear wheels reach or exceed a predetermined threshold stored in the memory 71.

The control-termination determiner 83 is a section for determining whether or not to terminate the TCS control and the inter-axle differential control. In this exemplary embodiment, the control-termination determiner 83 determines whether or not to terminate the brake control on the front wheels 4, the brake control on the center wheels 4, and the inter-axle differential control with reference to a control deviation S of each of the wheels 4 obtained by the braking mechanism controller 84.

The braking mechanism controller 84 generates and outputs a control command for the TCS. For generating the control command, an actual slip ratio λ, of each of the wheels 4 is calculated by the following equation (1) based on a vehicle speed V of the dump truck 1 estimated by the later-described vehicle speed estimator 80, a radius r of the wheels 4, and the rotation speeds ωfl, ωfr, ωcl and ωcr of the respective wheels 4.

$$\lambda = (r\omega - V)/r\omega \qquad (1)$$

Next, the braking mechanism controller 84 calculates a target slip ratio η for each of the wheels 4 by the following equation (2) with use of a target slip ratio ηs stored in the memory 71 and a modifying target slip ratio ηa set in accordance with the articulate angle detected by the articulate angle sensor 7A.

$$\eta = \eta s + \eta a \qquad (2)$$

The braking mechanism controller 84 calculates the control deviation S by the following equation (3) with the calculated actual slip ratio 2, and the target slip ratio η.

$$S = \lambda - \eta \qquad (3)$$

Next, the braking mechanism controller 84 estimates a force transmitted from the wheels 4 to the road surface (i.e., traction force) based on the output torque of the engine sent from the engine controller 2, speed stage information sent from the transmission controller 3, and the specification data of the dump truck 1 having been stored in the memory 71.

The braking mechanism controller 84 applies a control law of sliding mode control to the vehicle model of the dump truck 1 based on the calculated control deviations S and the estimated traction force to generate and output control commands to solenoids 611A, 612A, 613A, 621A, 622A and 623A of the TCS control hydraulic circuit 6, thereby controlling the braking forces of the wheels 4.

The differential adjusting mechanism controller 85 generates a control command for controlling the differential restraining force of the differential mechanism 1C and outputs the generated control command to the differential adjusting mechanism 1CA. Specifically, when the inter-axle differential control is determined to be performed by the control-start determiner 82, the differential adjusting mechanism controller 85 generates a control command for restraining the differential of the differential mechanism 1C and outputs the control command to the differential adjusting mechanism 1CA.

The retarder controller 86 enables a constant-speed travel control of the dump truck 1 based on information such as a payload of the dump truck 1 and slope conditions detected by the acceleration sensor 7D. When the retarder control lever 7C is ON, the retarder controller 86 generates and outputs control commands to the solenoids 611A, 612A, 613A, 621A, 622A and 623A and controls the braking of the front brakes 41 and the center brakes 42, thereby performing a constant-speed travel control.

5. Structure of Vehicle Speed Estimator 80

Figure 4:
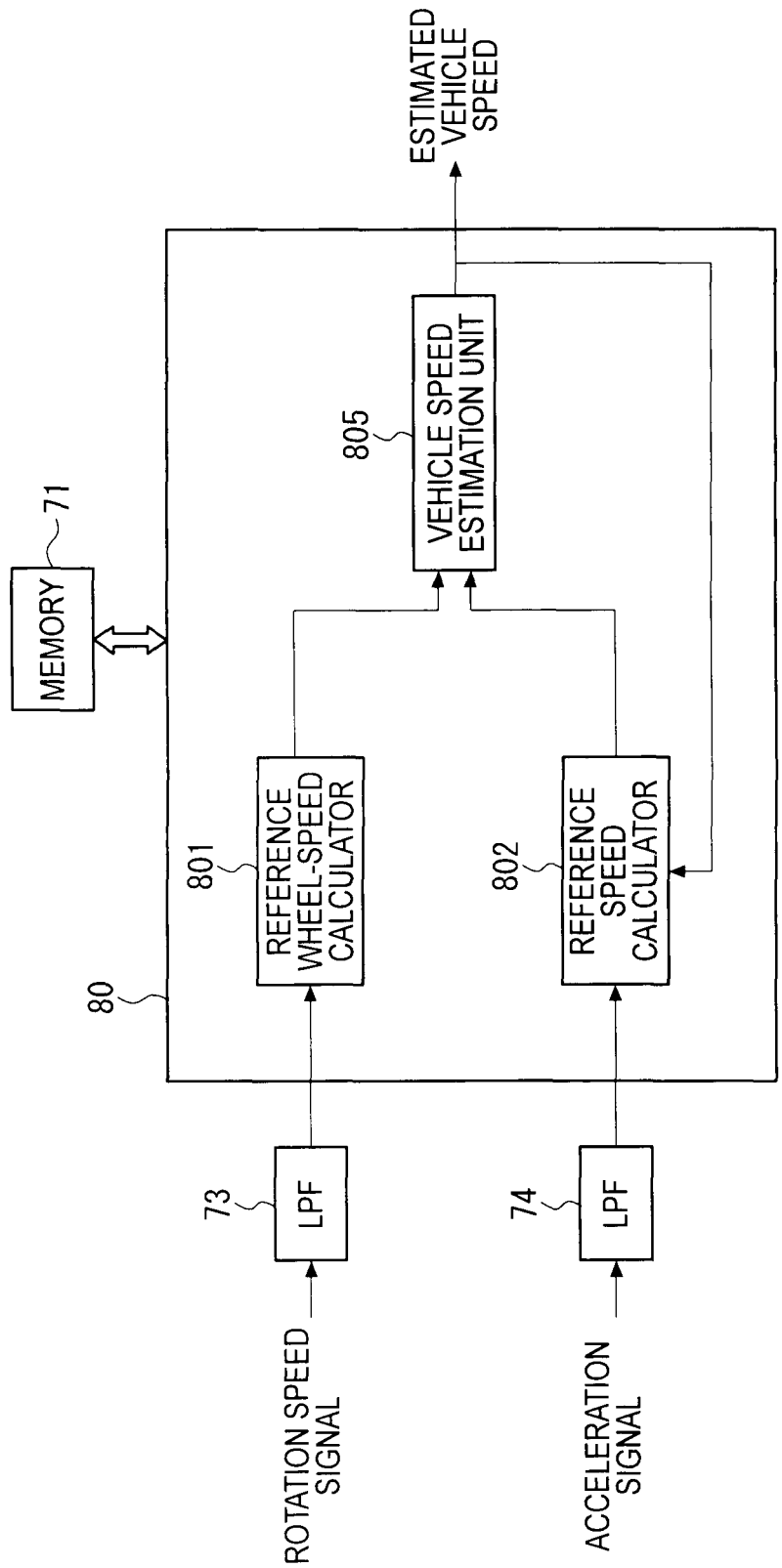
FIG. 4 is a functional block diagram of a vehicle speed estimator according to the exemplary embodiment.

FIG. 4 shows a detailed structure of the vehicle speed estimator 80. The vehicle speed estimator 80 includes a reference wheel-speed calculator 801, a reference speed calculator 802, and a vehicle speed estimation unit 805.

Figure 5:
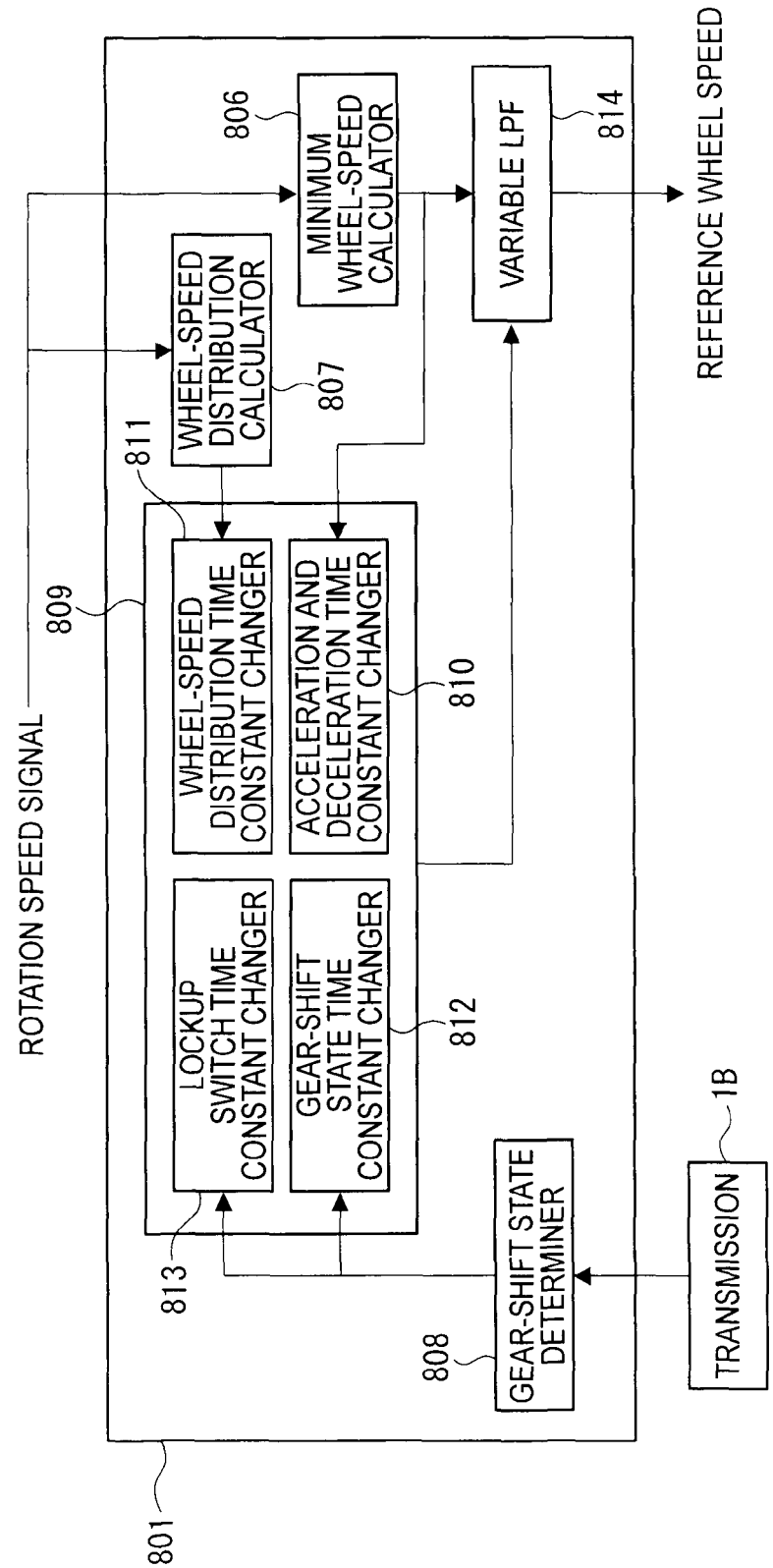
FIG. 5 is a functional block diagram of a reference wheel-speed calculator according to the exemplary embodiment.

As shown in FIG. 5, the reference wheel-speed calculator 801 includes a minimum wheel-speed calculator 806, a wheel-speed distribution calculator 807, a gear-shift state determiner 808, a time constant changer 809, and a variable LPF 814 as a variable filter processor. The reference wheel-speed calculator 801 selects a minimum rotation speed ($\omega$min) among the rotation speeds ($\omega$fl, $\omega$fr, $\omega$cl and $\omega$cr) of the wheels 4 respectively detected by the rotation speed sensors 43FL, 43FR, 43CL and 43CR, calculates a reference wheel speed, and changes a time constant of the variable LPF 814 in accordance with travel conditions of the dump truck 1.

The time constant changer 809 is functionally differentiated into an acceleration and deceleration time constant changer 810, a wheel-speed distribution time constant changer 811, a gear-shift state time constant changer 812, and a lockup switch time constant changer 813.

The minimum wheel-speed calculator 806 calculates the wheel speed from signals of the rotation speeds $\omega$ ($\omega$fl, $\omega$fr, $\omega$cl, $\omega$cr) of the wheels 4 respectively detected by the rotation speed sensors 43FL, 43FR, 43CL and 43CR based on the following equation (4) using the radius r of the wheels 4.

$$V = r \times \omega \quad (4)$$

The minimum wheel-speed calculator 806 calculates the minimum wheel speed Vmin based on the minimum rotation speed $\omega$min.

The minimum wheel speed Vmin calculated by the minimum wheel-speed calculator 806 is processed through a low-pass filter processing by the variable LPF 814 in accordance with the travel conditions of the dump truck 1 and is output to the vehicle speed estimation unit 805 as a reference wheel speed Vre1.

The minimum rotation speed $\omega$ of the wheels 4 having the minimum rotation speed $\omega$ is selected because the wheel 4 having the minimum rotation speed $\omega$ is skidding the least among all the wheels 4 of the dump truck 1.

The wheel-speed distribution calculator 807 acquires the maximum wheel speed and the minimum wheel speed among the wheel speeds of all the wheels 4 and calculates a distribution (variation) of the wheel speeds of the wheels 4 at every predetermined time based on a difference between the maximum wheel speed and the minimum wheel speed. The calculated wheel speed distribution is output to the wheel-speed distribution time constant changer 811.

The gear-shift state determiner 808 determines a gear-shift state of the transmission 1B. When determining that the gear of the dump truck 1 is getting shifted, the gear-shift state determiner 808 outputs the determination to the gear-shift state time constant changer 812. When determining that a predetermined time has not passed after an output of lockup-release command, the gear-shift state determiner 808 outputs the determination to the lockup switch time constant changer 813.

The acceleration and deceleration time constant changer 810 changes a time constant of the low-pass filter processing of the variable LPF 814 based on whether the minimum wheel speed Vmin (=r×$\omega$min) calculated from the minimum rotation speed $\omega$min calculated by the minimum wheel-speed calculator 806 is decelerating or accelerating.

The wheel-speed distribution time constant changer 811 changes the time constant of the low-pass filter processing of the variable LPF 814 when the distribution of the wheel speeds of the wheels 4 which is calculated by the wheel-speed distribution calculator 807 is a predetermined threshold or more.

When the gear-shift state determiner 808 determines the transmission 1B is getting shifted, the gear-shift state time constant changer 812 changes the time constant of the low-pass filter processing of the variable LPF 814.

When the gear-shift state determiner 808 determines that a predetermined time has not passed after the output of the lockup-release command in the transmission 1B, the lockup switch time constant changer 813 changes the time constant of the low-pass filter processing of the variable LPF 814.

Referring to FIG. 4, the reference speed calculator 802 calculates a reference speed Vre2 from an acceleration filter value input through LPF 74. Specifically, the reference speed calculator 802 calculates the acceleration filter value input during travel of the dump truck 1 as an acceleration and deceleration component, adds a value of integral of the acceleration and deceleration component to the previously estimated vehicle speed V in accordance with the travel conditions of the dump truck 1, and sets the reference speed Vre2 which is a candidate of another estimated vehicle speed V. Under the conditions that the acceleration and deceleration component is less than zero and the transmission 1B is released from a lockup, the reference speed calculator 802 does not execute the integration processing and sets the previously estimated vehicle speed V as the reference speed Vre2 so as to avoid further speed-reduction due to increasing brake commands during the TCS control (which will be described later in detail).

The vehicle speed estimation unit 805 estimates the vehicle speed V to be finally used in the equation (1) in the TCS control of the braking mechanism controller 84 based on the reference wheel speed Vre1 calculated by the reference wheel-speed calculator 801 and the reference speed Vre2 calculated by the reference speed calculator 802.

The vehicle speed estimation unit 805 determines whether the reference speed Vre2 calculated by the reference speed calculator 802 is excessively high or low. When determining the reference speed Vre2 is erroneously calculated, the vehicle speed setting unit 814 estimates the vehicle speed V as the reference wheel speed Vre1. The vehicle speed V is estimated in accordance with the travel conditions of the dump truck 1 (which will be described later in detail), as shown in the following Table 1.

TABLE 1

| JUDGING CONDITIONS | PROCESSING CONTENTS |
|---|---|
| accelerator off or Vre1 < 0.3 m/s | V = Vre1 |
| Vre2 < Vre1 × 0.5 | V = Vre1 × 0.5 |
| Vre2 > Vre1 | V = Vre1 |
| less than 0.1 of control deviations of all wheels and less than −0.1 m/s² of acceleration and deceleration component | The previous estimated wheel speed is maintained. |

6. Operation and Effects of Vehicle Speed Estimator 80

Next, an operation of the above-described vehicle speed estimator 80 will be described with reference to FIGS. 6 to 14.

Figure 6:
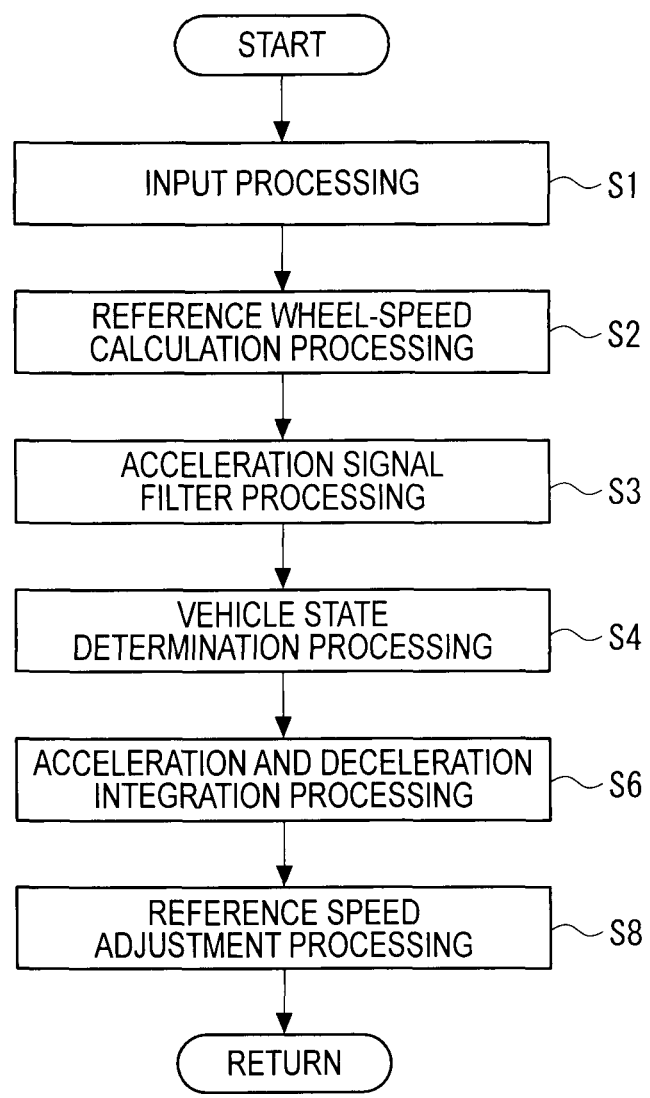
FIG. 6 is a flowchart for illustrating an operation in the exemplary embodiment.
Figure 7:
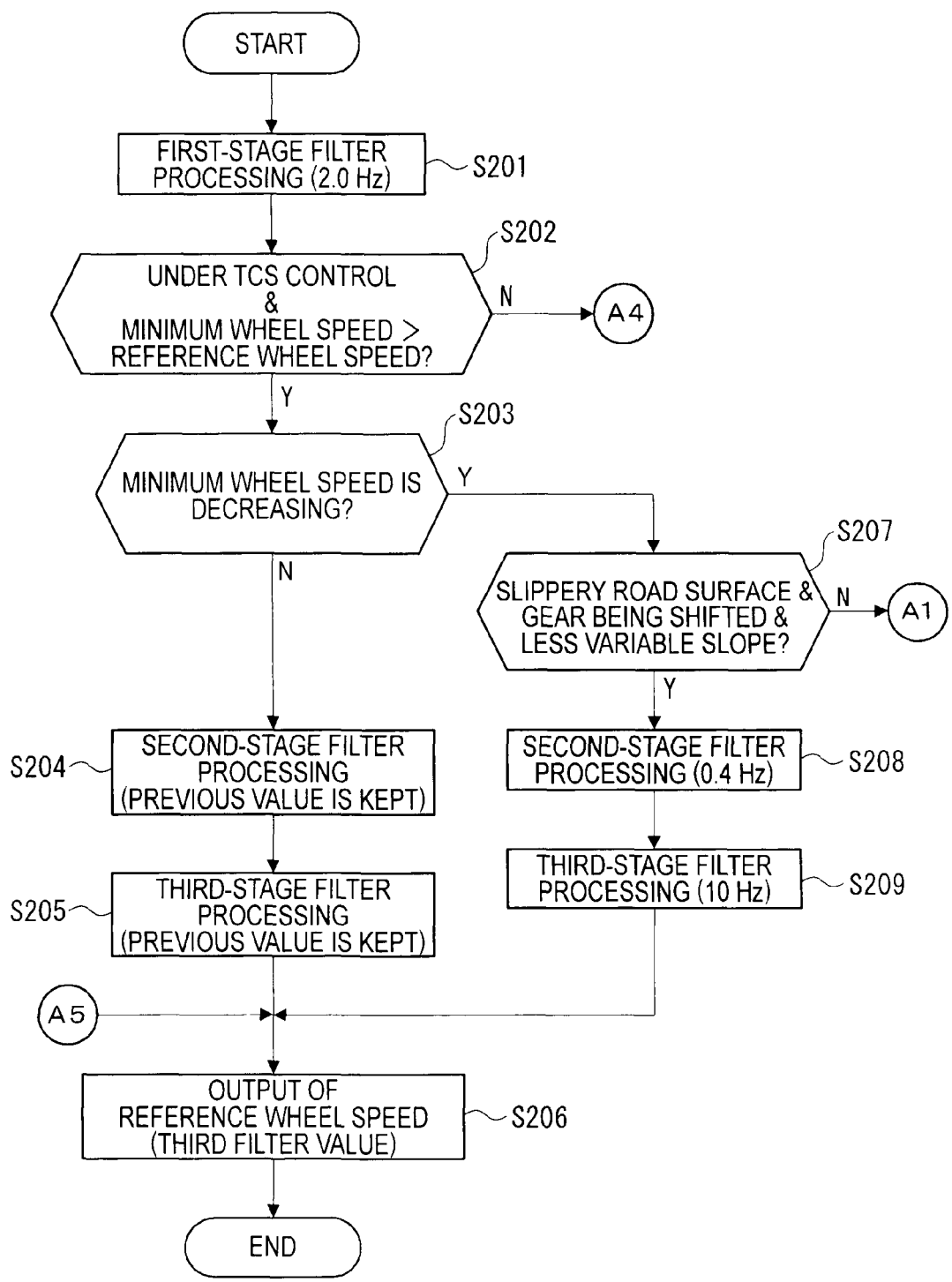
FIG. 7 is a flowchart for illustrating steps of a reference wheel-speed calculation processing in the exemplary embodiment.
Figure 8:
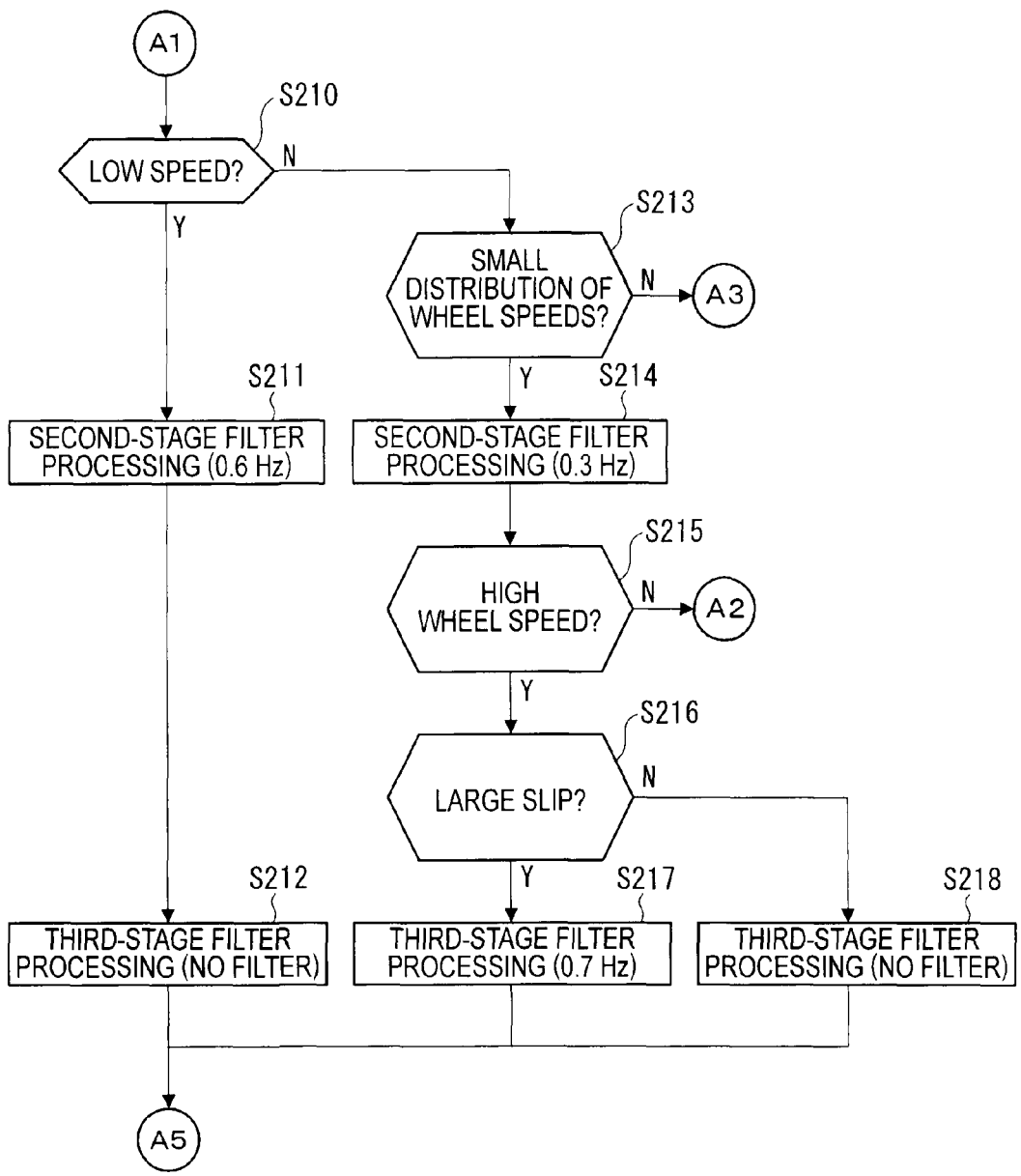
FIG. 8 is a flowchart for illustrating steps of the reference wheel-speed calculation processing in the exemplary embodiment.
Figure 9:
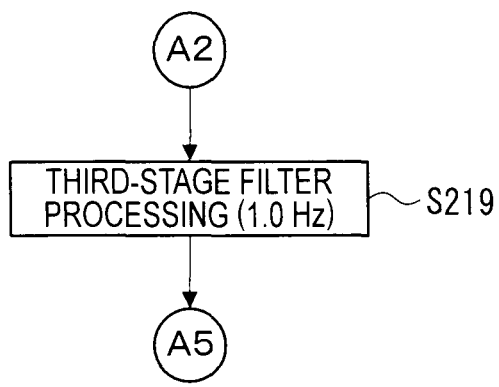
FIG. 9 is a flowchart for illustrating steps of the reference wheel-speed calculation processing in the exemplary embodiment.
Figure 10:
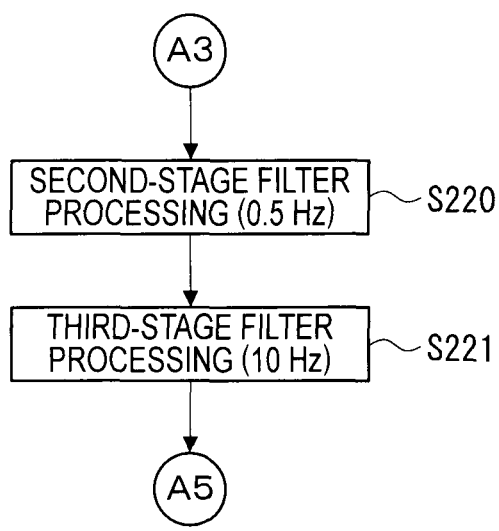
FIG. 10 is a flowchart for illustrating steps of the reference wheel-speed calculation processing in the exemplary embodiment.
Figure 11:
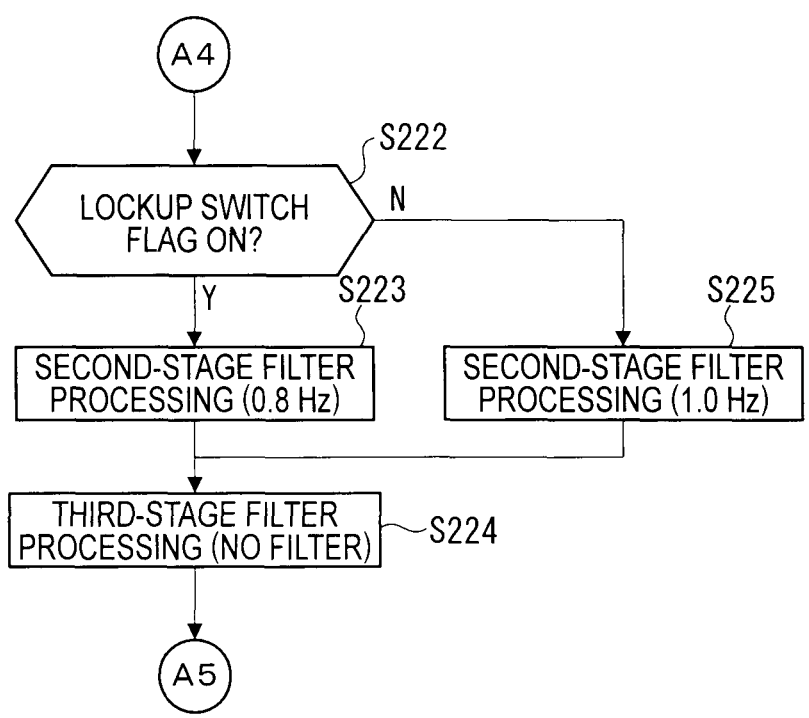
FIG. 11 is a flowchart for illustrating steps of the reference wheel-speed calculation processing in the exemplary embodiment.

As shown in FIG. 6, the vehicle speed estimator 80 performs an input processing S1 for inputting various data, a reference wheel-speed calculation processing S2, an acceleration signal filter processing S3, a vehicle state determination processing S4, an acceleration and deceleration component integration processing S6 and a reference speed adjustment processing S8, thereby estimating the vehicle speed of the dump truck 1. The processings S1 to S 8 will be respectively described in detail. The processings S1 to S 8 are repeated in a predetermined cycle.

(6-1) Input Processing S1

In order to operate the vehicle speed estimator 80 to estimate a vehicle speed, various state data of the dump truck 1 are input to the vehicle speed estimator 80. Specifically, the rotation speeds from the rotation speed sensors 43FL, 43FR, 43CL and 43CR, flag information showing whether or not the TCS control is under operation, flag information showing whether or not a lockup is switched, flag information showing whether an accelerator operation is ON or OFF, and flag information showing whether or not rotation deviation of the right and left wheels occurs are input to the vehicle speed estimator 80.

(6-2) Reference Wheel-Speed Calculation Processing S2

The reference wheel-speed calculator 801 executes the reference wheel-speed calculation processing S2, specifically, the processing shown in the flowcharts of FIGS. 7 to 11.

Initially, the time constant changer 809 performs a first-stage filter processing by setting a time constant such that a cut-off frequency f of the variable LPF 814 is 2.0 Hz ($f=1/2\pi\tau$ in which $\tau$ is a time constant) (Step S201).

The minimum wheel-speed calculator 806 acquires the minimum wheel speed Vmin, which is a wheel speed having the minimum rotation speed, from the rotation speed signals $\omega fl$, $\omega fr$, $\omega cl$ and $\omega cr$ which are input via LPF 73 during the TCS control and outputs the minimum wheel speed Vmin to the acceleration and deceleration time constant changer 810. The time constant changer 809 determines whether or not the minimum wheel speed Vmin exceeds the previous reference wheel speed Vre1 (Step S202).

When determining that the minimum wheel speed Vmin exceeds the previous reference wheel speed Vre1, the time constant changer 809 determines whether or not the minimum wheel speed Vmin is decelerating based on the minimum wheel speed Vmin input at every predetermined time (Step S203).

When the time constant changer 809 determines that the minimum wheel speed Vmin is not decelerating, the acceleration and deceleration time constant changer 810 of the time constant changer 809 performs a second-stage filter processing (Step S204) and a third-stage filter processing (Step S205). For these processings, the time constant is set larger. Since the time constant is larger, the signals through the low-pass filter processing slowly change. Alternatively, Steps S204 and S205 are skipped and the previous reference wheel speed Vre1 (a third-stage filter output value) is output. The variable LPF 814 sets the third-stage filter output value as the reference wheel speed Vre1 and outputs the reference wheel speed Vre1 to the vehicle speed estimation unit 805 (Step S206).

The reference wheel-speed calculator 801 selects a maximum rotation speed $\omega max$ and the minimum rotation speed $\omega min$ from the rotation speeds $\omega fl$, $\omega fr$, $\omega cl$ and $\omega cr$ of the wheels 4 respectively input from the rotation sensors 43FL, 43FR, 43CL and 43CR, and calculates a maximum reference wheel speed Vmax and the minimum reference wheel speed Vmin by the equation (4).

On the other hand, when the time constant changer 809 determines that the minimum wheel speed Vmin is decelerating, the gear-shift state time constant changer 812 of the time constant changer 809 determines, based on the gear-shift states of the transmission 1B of the dump truck output from the gear-shift state determiner 808, whether or not to satisfy all the conditions: the dump truck 1 is travelling on a slippery road surface; the transmission 1B is getting shifted; and a slope is less variable.

When determining that all the conditions are satisfied, the gear-shift state time constant changer 812 of the time constant changer 809 performs the second-stage filter processing by changing the time constant of the variable LPF 814 such that the cut-off frequency f becomes 0.4 Hz (Step S208) and performs the third-stage filter processing by changing the time constant of the variable LPF 814 such that the cut-off frequency f becomes 10 Hz (Step S209).

The variable LPF 814 sets a filter value after the third-stage filter processing as the reference wheel speed Vre1 and outputs the reference wheel speed Vre1 to the vehicle speed estimation unit 805 (Step S206).

When determining that one of the conditions is not satisfied in Step S207, the time constant changer 809 determines whether or not the vehicle speed of the dump truck 1 is low (e.g., 0.5 m/s or less) (Step S210).

When determining that the vehicle speed is low, the time constant changer 809 performs the second-stage filter processing by changing the time constant of the variable LPF 814 such that the cut-off frequency f becomes 0.4 Hz (Step S211) and performs the third-stage filter processing without filtering. Specifically, the input value is output without being filtered (Step S212).

The variable LPF 814 sets the filter value after the third-stage filter processing as the reference wheel speed Vre1 and outputs the reference wheel speed Vre1 to the vehicle speed estimation unit 805 (Step S206).

When determining that the vehicle speed is not low, the wheel-speed distribution time constant changer 811 determines whether or not the distribution of the wheel speeds calculated by the wheel-speed distribution calculator 807 is less than a predetermined threshold (i.e., the distribution of the wheel speeds is small).

When determining that the distribution of the wheel speeds is small, the wheel-speed distribution time constant changer 811 performs the second-stage filter processing by changing the time constant of the variable LPF 814 such that the cut-off frequency f becomes 0.3 Hz (Step S214).

The time constant changer 809 determines whether the wheel speeds exceed a predetermined threshold (i.e., the wheel speeds are high) (Step S215). When determining that the wheel speeds are high, the time constant changer 809 determines whether or not a large slipping occurs (Step S216).

When determining that a large slipping occurs, the time constant changer 809 performs the third-stage filter processing by changing the time constant of the variable LPF 814 such that the cut-off frequency f becomes 0.7 Hz (Step S217).

The variable LPF 814 sets the filter value after the third-stage filter processing as the reference wheel speed Vre1 and outputs the reference wheel speed Vre1 to the vehicle speed estimation unit 805 (Step S206).

When determining that a large slipping does not occur, the time constant changer 809 performs the third-stage filter processing without filtering. Specifically, the input value is output without being filtered (Step S218).

The variable LPF 814 sets the filter value after the third-stage filter processing as the reference wheel speed Vre1 and outputs the reference wheel speed Vre1 to the vehicle speed estimation unit 805 (Step S206).

When determining that the wheel speeds are not high in Step S215, the time constant changer 809 performs the third-stage filter processing by changing the time constant of the variable LPF 814 such that the cut-off frequency f becomes 1.0 Hz (Step S219).

The variable LPF 814 sets the filter value after the third-stage filter processing as the reference wheel speed Vre1 and outputs the reference wheel speed Vre1 to the vehicle speed estimation unit 805 (Step S206).

When determining that the distribution of the wheel speeds is large, the time constant changer 809 performs the second-stage filter processing by changing the time constant of the variable LPF 814 such that the cut-off frequency f becomes 0.5 Hz (Step S220) and performs the third-stage filter processing by changing the time constant of the variable LPF 814 such that the cut-off frequency f becomes 10 Hz (Step S221).

The variable LPF 814 sets the filter value after the third-stage filter processing as the reference wheel speed Vre1 and outputs the reference wheel speed Vre1 to the vehicle speed estimation unit 805 (Step S206).

When determining that the minimum wheel speed Vmin is lower than the previous reference wheel speed Vre1, the lockup switch time constant changer 813 of the time constant changer 809 determines whether or not a lockup switch flag is ON based on the output from the gear-shift state determiner 808 (Step S222).

When determining that the lockup switch flag is ON, the lockup switch time constant changer 813 performs the second-stage filter processing by changing the time constant of the variable LPF 814 such that the cut-off frequency f becomes 0.8 Hz (Step S223) and performs the third-stage filter processing without filtering. Specifically, the input value is output without being filtered (Step S224).

The variable LPF 814 sets the filter value after the third-stage filter processing as the reference wheel speed Vre1 and outputs the reference wheel speed Vre1 to the vehicle speed estimation unit 805 (Step S206).

When determining that the lockup switch flag is OFF, the lockup switch time constant changer 813 performs the second-stage filter processing by changing the time constant of the variable LPF 814 such that the cut-off frequency f becomes 1.0 Hz (Step S225) and performs the third-stage filter processing without filtering. Specifically, the input value is output without being filtered (Step S224).

The variable LPF 814 sets the filter value after the third-stage filter processing as the reference wheel speed Vre1 and outputs the reference wheel speed Vre1 to the vehicle speed estimation unit 805 (Step S206).

Figure 12:
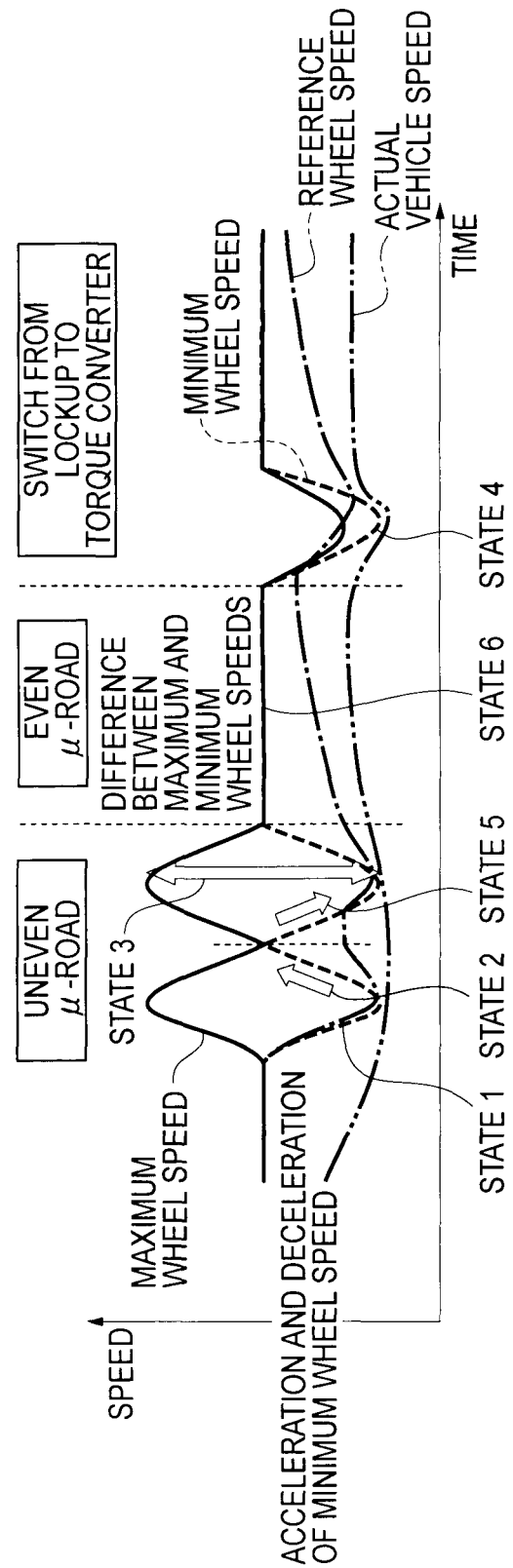
FIG. 12 is a schematic view showing operation of the reference wheel-speed calculation processing in the exemplary embodiment.

The reference wheel-speed calculator 801 includes the time constant changer 809. The time constant changer 809 includes the acceleration and deceleration time constant changer 810, the wheel-speed distribution time constant changer 811, the gear-shift state time constant changer 812 and the lockup switch time constant changer 813. Thus, as shown in FIG. 12, on an uneven μ-road, when the minimum wheel speed Vmin is decelerating (State 1), it is predicted that the minimum wheel speed Vmin is likely to approach the actual speed of the construction vehicle. Consequently, in order to easily conform the reference wheel speed Vre1 to the minimum wheel speed Vmin, the time constant of the low-pass filer processing is decreased, so that the vehicle speed of the dump truck 1 can be estimated with high accuracy.

It should be noted that, when Vmin>Vre1 (State 5), Vre1 is maintained until Vmin<Vre1 is obtained by increasing the time constant.

On the other hand, when the minimum wheel speed Vmin is accelerating (State 2), it is predicted that the minimum wheel speed Vmin is likely to deviate from the actual speed of the dump truck 1. Accordingly, by increasing the time constant of the low-pass filer processing, a large change of the reference wheel speed Vre1 can be avoided.

When the distribution showing a difference between the maximum wheel speed and the minimum wheel speed exceeds a predetermined threshold (State 3), it is predicted that the vehicle is traveling on a non-uniform road surface, or that non-uniform loads act on the wheels 4 to cause one of the wheels 4 having the maximum wheel speed Vmax to slip and the wheel speed of another of the wheels 4 determined as the minimum wheel speed Vmin to approach the actual vehicle speed of the dump truck 1. Accordingly, by decreasing the time constant of the low-pass filter processing to immediately conform the reference wheel speed Vre1 to the minimum wheel speed Vmin, the vehicle speed of the dump truck 1 can be estimated with high accuracy.

When the distribution is smaller than the predetermined threshold (State 6), it is determined that the vehicle is travelling on an even road surface. Accordingly, the time constant is increased (which is a reversed case of "State 3").

When the transmission 1B is just switched from the lockup state to the torque converter (State 4), drive torque from the engine 1A is lost to drastically decrease the minimum wheel speed Vmin. Subsequently, drive torque is generated to re-increase the minimum wheel speed Vmin. When the minimum wheel speed is decreased, it is predicted that the minimum wheel speed approaches the actual vehicle speed of the construction machine. In such a situation, it is natural to decrease the time constant and perform a control to conform the reference wheel speed Vre1 to the minimum wheel speed Vmin. However, in the case of employing the TCS control as in the exemplary embodiment, when the reference wheel speed Vre1 is excessively conformed to the minimum wheel speed Vmin, the brakes 41 and 42 may be excessively applied during the TCS control as a result of an increase in the minimum wheel speed Vmin due to generation of drive torque. Accordingly, the time constant is increased so as not to easily conform the reference wheel speed Vre1 to the minimum wheel speed Vmin, thereby preventing such an excessive application of the brakes 41 and 42 during the TCS control.

(6-3) Acceleration Signal Filter Processing S3

Referring to FIG. 6, in the acceleration signal filter processing S3, the acceleration signal output from the acceleration sensor 7D is filtered by the LPF 74 to remove noises, vehicle vibration components and the like. The acceleration filter value obtained through the filter processing is output to the vehicle speed estimator 80.

(6-4) Vehicle State Determination Processing S4

The vehicle state determination processing S4 (not shown) is a processing by a vehicle state determiner in the processor 72 for stop-and-backward-movement determination of the dump truck 1, vehicle-speed erroneous-estimation determination, lockup determination, gear-shift determination and front-rear rotation speed difference determination.

In the stop determination, the vehicle is determined to be stopped when the maximum reference wheel speed is 0 or less and the accelerator operation is OFF.

In the backward-movement determination, since a forward direction of the dump truck 1 is set as positive in the vehicle speed estimation in this exemplary embodiment, when a gear of the dump truck 1 is set at R1 or R2, the dump truck 1 is determined as going backward and an accelerometer filter value is reversed to negative.

In the vehicle-speed erroneous-estimation determination, it is determined as an erroneous balance between the vehicle speed estimation and the braking control that the control deviation S is rather large and is kept within a predetermined range for a predetermined time or more. Accordingly, the first vehicle-speed erroneous estimation flag showing this state is stored as ON.

Moreover, it is also determined as an erroneous estimation of the vehicle speed that the control deviation S is small and a large braking control is kept for a predetermined time. Accordingly, the second vehicle-speed erroneous estimation flag showing this state is stored as ON.

The lockup determination is a processing for determining a lockup state when a gear-shift command is given to shift to a position other than the neutral position. Switch flag information is determined to be ON for a predetermined time after a lockup release command is output and to be OFF after the predetermined time.

The gear-shift determination is a processing for determining whether or not the gear of the transmission 1B is getting shifted and determines a gear-shift state of the transmission 1B based on a gear-shift signal of the transmission controller 3.

(6-5) Acceleration and Deceleration Component Integration Processing S6

Figure 13:
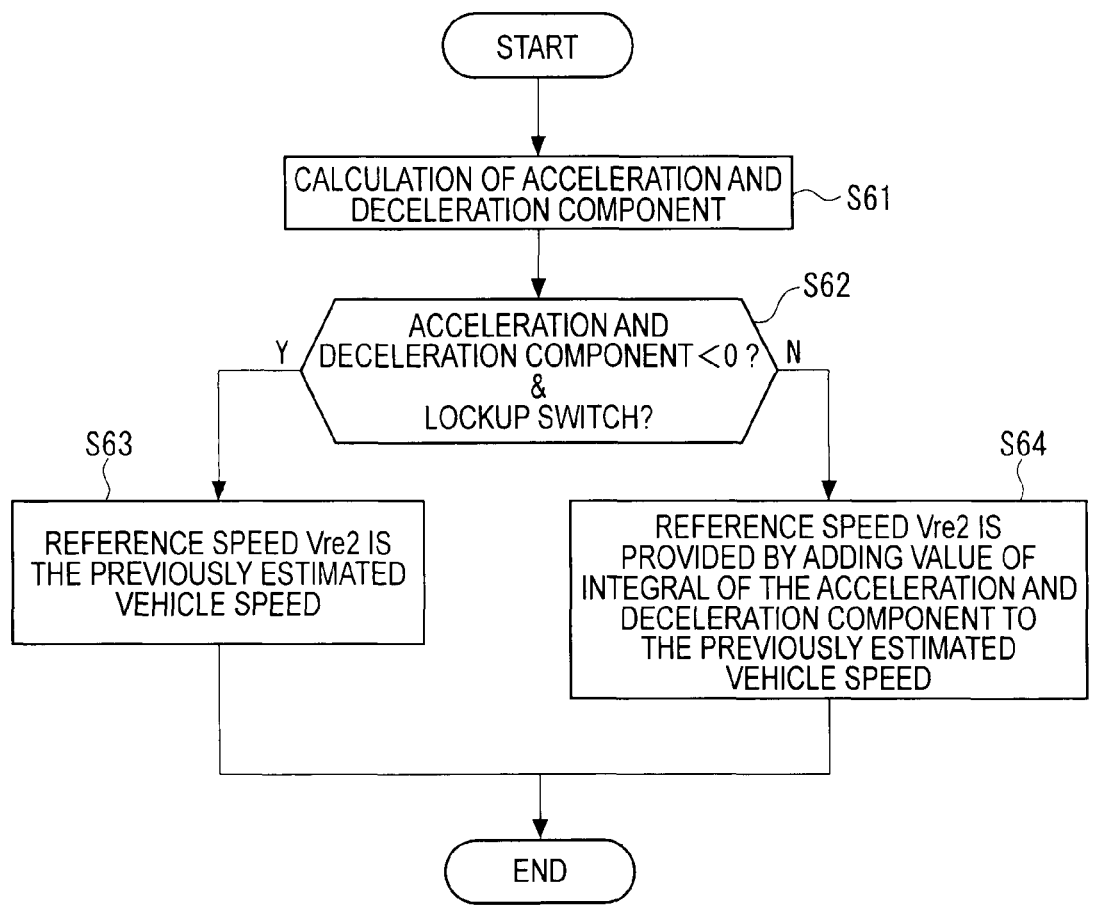
FIG. 13 is a flowchart for illustrating steps of an integration processing of an acceleration and deceleration component in the exemplary embodiment.

As shown in the flowchart of FIG. 13, the reference speed calculator 802 initially calculates the acceleration filter value as the acceleration and deceleration component (Step S61).

The reference speed calculator 802 determines whether or not the calculated acceleration and deceleration component is less than zero and the lockup switch flag information is ON (Step S62).

When determining that the calculated acceleration and deceleration component is less than zero and the lockup switch flag information is ON (Step S62), the reference speed calculator 802 sets the previously estimated vehicle speed V as the reference speed Vre2 (Step S63).

On the other hand, when either of the conditions shown in Step S62 is not satisfied, the reference speed calculator 802 adds a value of integral of the acceleration and deceleration component to the previously estimated vehicle speed V (Step S64). The value of integral of the acceleration and deceleration component is calculated by multiplying the value of the acceleration and deceleration component that is calculated by a predetermined sampling cycle by a sampling time.

(6-6) Reference Speed Adjustment Processing S8

The vehicle speed estimation unit 805 executes the reference speed adjustment processing S8, which is specifically the processing shown in the flowchart of FIG. 14.

First, the vehicle speed estimation unit 805 determines whether the acceleration is OFF or the reference wheel speed Vre1 is less than 0.3 m/sec (Step S81).

When either of the conditions in Step S81 is satisfied, the vehicle speed estimation unit 805 determines that the vehicle is not skidding. The vehicle speed estimation unit 805 sets the estimated vehicle speed V at the reference vehicle speed Vre1 and sets an amount provided by subtracting the reference vehicle speed Vre1 from the reference speed Vre2 as a value-of-integral adjusted amount (Step S82).

When the conditions in Step S81 are not satisfied, the vehicle speed estimation unit 805 determines whether the reference speed Vre2 is less than a predetermined value (e.g., less than half) of the reference vehicle speed Vre1 (Step S83).

When the condition in Step S83 is satisfied, the vehicle speed estimation unit 805 determines that, when the estimated vehicle speed V is excessively low, the brakes may be excessively applied in the TCS braking control. The vehicle speed estimation unit 805 sets the estimated vehicle speed V at, for instance, half of the reference vehicle speed Vre1 and sets an amount provided by subtracting half of the reference vehicle speed Vre1 from the reference speed Vre2 as a value-of-integral adjusted amount (Step S84).

When the condition in Step S83 is not satisfied, the vehicle speed estimation unit 805 determines whether the reference speed Vre2 is higher than the reference vehicle speed Vre1 (Step S85).

When the condition in Step S85 is satisfied, the vehicle speed estimation unit 805 determines that the estimated vehicle speed V does not exceed the reference vehicle speed Vre1. The vehicle speed estimation unit 805 sets the estimated vehicle speed V at Vre1 and sets an amount provided by subtracting the reference vehicle speed Vre1 from the reference speed Vre2 as a value-of-integral adjusted amount (Step S86).

When the condition in Step S85 is not satisfied, the vehicle speed estimation unit 805 determines whether the control deviations S of all the wheels which the braking mechanism controller 84 calculates by the equation (3) are less than 0.1 and the acceleration and deceleration component is less than $-0.1$ m/sec$^2$ (Step S87).

When the conditions in Step S87 are satisfied, the vehicle speed estimation unit 805 determines that, when a vehicle speed is reducing in spite of the control deviations S being in an appropriate range, the control deviations S may be further increased to cause an increase in a brake force by the braking mechanism control to further reduce the vehicle speed. Accordingly, the vehicle speed estimation unit 805 sets the estimated vehicle speed V at the previously estimated vehicle speed V and sets an amount provided by subtracting the previously estimated vehicle speed V from the reference speed Vre2 as a value-of-integral adjusted amount (Step S88).

When the conditions in Step S87 are not satisfied, the vehicle speed estimation unit 805 sets the reference speed Vre2 calculated by the reference speed calculator 802 as the estimated vehicle speed V (Step S89).

The invention is not limited to the above-described exemplary embodiment, but is applicable to the following.

Specifically, the above-described vehicle speed estimator 80 is applied to an articulate-type dump truck 1, however, an application of the invention is not limited thereto. More specifically, the invention is applicable to a rigid-type dump truck. Moreover, the invention is applicable to not only a dump truck but also a construction vehicle provided with wheels such as those of a wheel loader.

In the above exemplary embodiment, the vehicle speed estimator 80 is used for estimating the vehicle speed provided by the TCS control. However, the invention may be used for estimating the vehicle speed provided by an ABS control of all-wheel-drive construction vehicles.

Specific structures and configurations of the invention may be altered in use in any manner as long as an object of the invention is achieved.

The invention claimed is:

1. A vehicle speed estimator that estimates a vehicle speed of an all-wheel-drive construction vehicle, comprising:
   a rotation speed detector that detects a rotation speed of each of wheels at every predetermined time; and
   a reference wheel-speed calculator that selects a minimum rotation speed among the rotation speeds of the wheels detected by the rotation speed detector, calculates a reference wheel speed of the construction vehicle at every predetermined time, and output the reference wheel speed, wherein
   the reference wheel-speed calculator comprises:
   a minimum wheel-speed calculator that calculates a minimum wheel speed at every predetermined time based on the rotation speeds detected by the rotation speed detector;
   a variable filter processor that performs a low-pass filter processing to the minimum wheel speed calculated by the minimum wheel-speed calculator, the variable filter processor having a variable time constant;
   a time constant changer that changes the time constant of the variable filter processor in accordance with travel conditions of the construction vehicle; and
   a gear-shift state determiner that determines a state of a transmission of the construction vehicle, wherein
   the time constant changer comprises a gear-shift state time constant changer that increases the time constant of the variable filter processor when the gear-shift state determiner determines that the transmission is getting shifted.

2. The vehicle speed estimator according to claim 1, further comprising:
   a vehicle speed estimation unit that estimates the vehicle speed of the construction vehicle based on the reference wheel speed calculated by the reference wheel-speed calculator and outputs the estimated vehicle speed.

3. The vehicle speed estimator according to claim 1, further comprising:
   a wheel-speed distribution calculator that acquires a maximum wheel speed and the minimum wheel speed from the rotation speeds of the wheels detected by the rotation speed detector and calculates a distribution of wheel speeds of the wheels at every predetermined time based on a difference between the maximum wheel speed and the minimum wheel speed, wherein the time constant changer comprises a wheel-speed distribution time constant changer that changes the time constant of the variable filter processor when determining the distribution of the wheel speeds calculated by the wheel-speed distribution calculator is a predetermined threshold or more.

4. A traction control apparatus that controls a braking mechanism and a differential adjusting mechanism in an all-wheel-drive construction vehicle, the braking mechanism provided to each of wheels, the differential adjusting mechanism adjusting a differential between front ones of the wheels and rear ones of the wheels, the traction control apparatus comprising:
   the vehicle speed estimator according to claim 1;
   a braking mechanism controller that controls the braking mechanism based on the vehicle speed of the construction vehicle which is estimated by the vehicle speed estimator; and
   a differential adjusting mechanism controller that controls the differential adjusting mechanism based on the vehicle speed of the construction vehicle which is estimated by the vehicle speed estimator.

5. A traction control apparatus that controls a braking mechanism and a differential adjusting mechanism in an all-wheel-drive construction vehicle, the braking mechanism provided to each of wheels, the differential adjusting mechanism adjusting a differential between front ones of the wheels and rear ones of the wheels, the traction control apparatus comprising:
   the vehicle speed estimator according to claim 2;
   a braking mechanism controller that controls the braking mechanism based on the vehicle speed of the construction vehicle which is estimated by the vehicle speed estimator; and
   a differential adjusting mechanism controller that controls the differential adjusting mechanism based on the vehicle speed of the construction vehicle which is estimated by the vehicle speed estimator.

6. A traction control apparatus that controls a braking mechanism and a differential adjusting mechanism in an all-wheel-drive construction vehicle, the braking mechanism provided to each of wheels, the differential adjusting mechanism adjusting a differential between front ones of the wheels and rear ones of the wheels, the traction control apparatus comprising:
   the vehicle speed estimator according to claim 3;
   a braking mechanism controller that controls the braking mechanism based on the vehicle speed of the construction vehicle which is estimated by the vehicle speed estimator; and
   a differential adjusting mechanism controller that controls the differential adjusting mechanism based on the vehicle speed of the construction vehicle which is estimated by the vehicle speed estimator.

* * * * *